United States Patent
Vojkovich

(10) Patent No.: US 9,549,147 B2
(45) Date of Patent: Jan. 17, 2017

(54) SYSTEM AND METHOD FOR CREATING A VIDEO FRAME FROM A SINGLE VIDEO FIELD

(71) Applicant: Nvidia Corporation, Santa Clara, CA (US)

(72) Inventor: Mark Vojkovich, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 109 days.

(21) Appl. No.: 14/179,825

(22) Filed: Feb. 13, 2014

(65) Prior Publication Data

US 2015/0229879 A1    Aug. 13, 2015

(51) Int. Cl.
*H04N 7/01* (2006.01)
*H04N 11/02* (2006.01)

(52) U.S. Cl.
CPC ............ *H04N 7/0135* (2013.01); *H04N 7/012* (2013.01)

(58) Field of Classification Search
CPC ..... H04N 7/012; H04N 7/0112; H04N 7/0142
USPC .......................................................... 348/448
See application file for complete search history.

(56) References Cited

U.S. PATENT DOCUMENTS

| | | | |
|---|---|---|---|
| 7,190,406 B2* | 3/2007 | Ji et al. | 348/448 |
| 2003/0098925 A1* | 5/2003 | Orlick | 348/448 |
| 2006/0209207 A1* | 9/2006 | Chow | 348/448 |
| 2011/0075026 A1* | 3/2011 | Wallace et al. | 348/448 |
| 2014/0147003 A1* | 5/2014 | Li | G06K 9/00234 382/103 |

* cited by examiner

*Primary Examiner* — Michael Lee

(57) ABSTRACT

A system and method of producing a frame of a video image from an interlaced field. In one embodiment, the method includes: (1) creating an equal-intensity trace from present samples in the field, (2) recognizing an equal-intensity path in the equal-intensity trace, (3) at least partially straightening the equal-intensity path and (4) using the equal-intensity path to determine an intensity value for a missing sample in the frame.

21 Claims, 26 Drawing Sheets

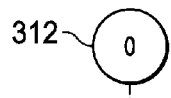
FIG. 3A  FIG. 3B  FIG. 3C
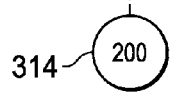
FIG. 4A  FIG. 4B

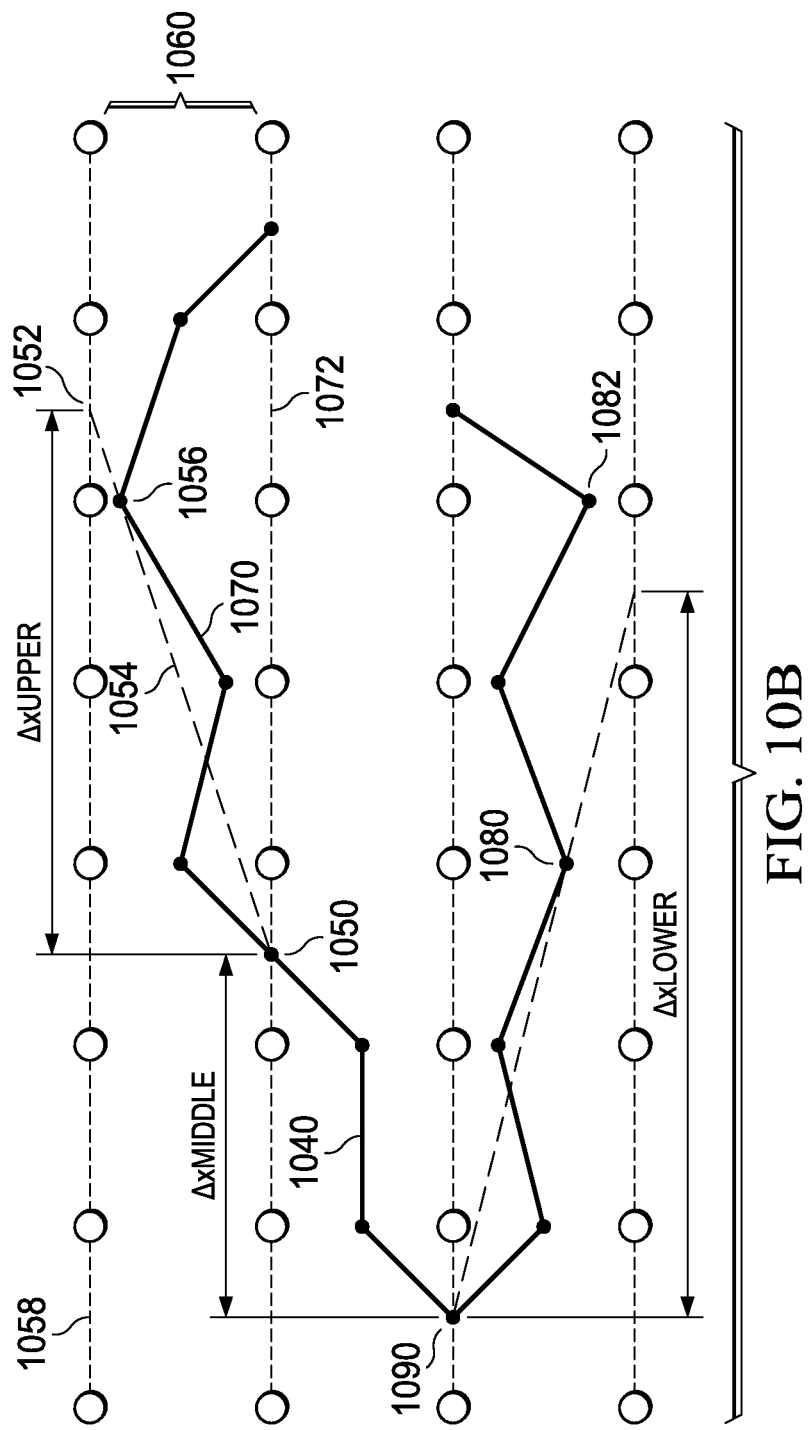

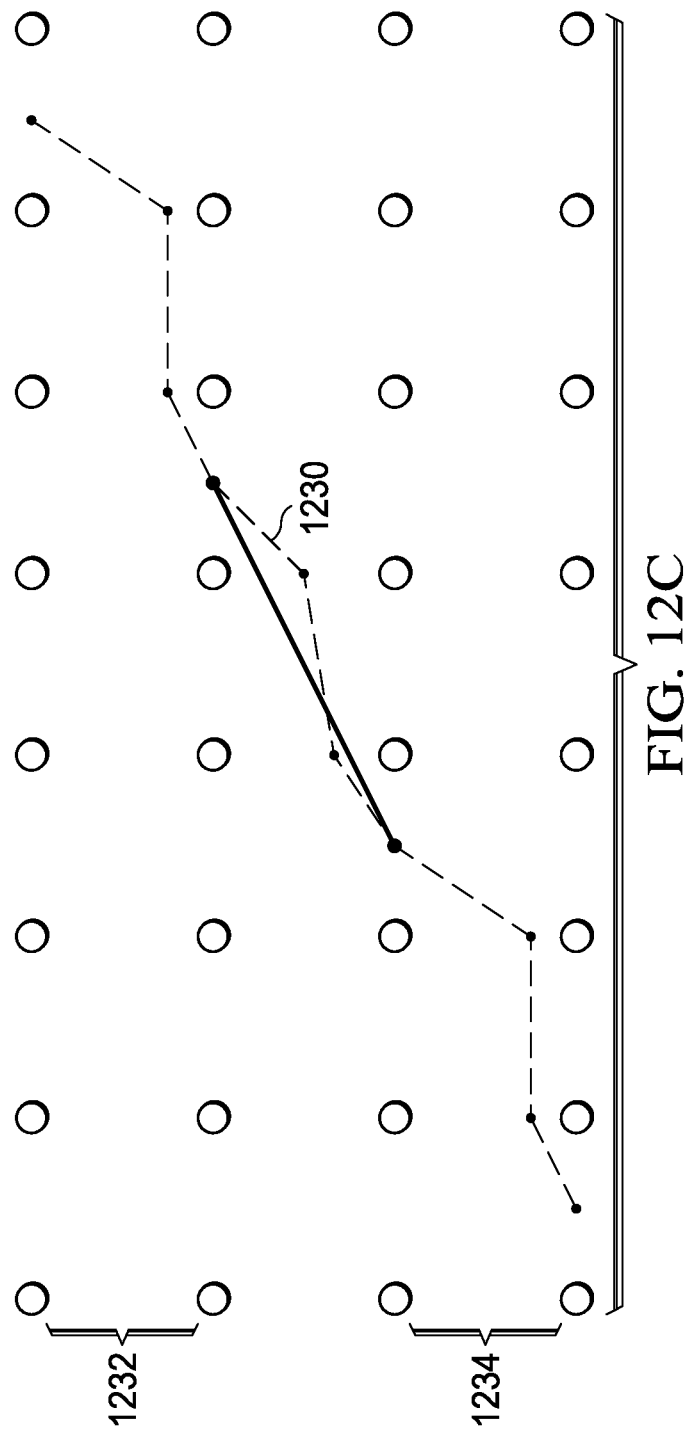

SYSTEM AND METHOD FOR CREATING A VIDEO FRAME FROM A SINGLE VIDEO FIELD

TECHNICAL FIELD

This application is directed, in general, to video image processing and, more, to a system and method for creating a video frame from a single video field.

BACKGROUND

As those skilled in the pertinent art are familiar, interlaced video fields have half the lines of a full video frame. A field containing odd horizontal lines or rows is followed by another one containing even horizontal lines or rows, thereby reducing bandwidth requirements but maintaining an acceptable perceived resolution. As bandwidth has increased and video compression has become more powerful, video frames are more often being transmitted without interlacing. This is called "progressive" video.

Sometimes, however, it is necessary or desirable to convert interlaced video to progressive video. This conversion, called deinterlacing, amounts to a 2× upsampling. The frame rate of the video image doubles as a result. The field contains intensity values for pixels on every other line or row, referred to herein as "present samples." Deinterlacing involves obtaining intensity values for the pixels in the missing interstitial lines or rows, referred to herein as "missing samples." A typical deinterlacing engine implements a pipeline having a spatial deinterlacing stage that deinterlaces based on the spatial features of a given field, and temporal deinterlacing stages that deinterlace based on multiple fields in time. A deinterlacing engine may be implemented as an integrated circuit (IC), an application-specific IC (ASIC) for video processing, a graphics processing unit (GPU), or other system-on-a-chip (SOC).

In spatial deinterlacing, assuming the lines are horizontal, a vertical linear interpolation may be used to obtain the intensity value for a missing sample located between two present samples. An alternative method involves identifying edges in the image described by the field data, and interpolating along the direction of the edges. The edge direction is usually identified by either identifying the local intensity gradient and assuming the edge is perpendicular to it, or feature matching between horizontal rows of pixels to determine the horizontal shift from one row to the next.

SUMMARY

One aspect provides a method of producing a frame from a field. In one embodiment, the method includes: (1) creating an equal-intensity trace from present samples in the field, (2) recognizing an equal-intensity path in the equal-intensity trace, (3) at least partially straightening the equal-intensity path and (4) using the equal-intensity path to determine an intensity value for a missing sample in the frame.

Another aspect provides an integrated circuit operable to produce a frame from a field. In one embodiment, the integrated circuit implements: (1) recognizing equal-intensity paths in equal-intensity traces generated from present samples in the field, (2) at least partially straightening the equal-intensity paths and (3) using the equal-intensity paths to determine an intensity value for a missing sample.

BRIEF DESCRIPTION

Reference is now made to the following descriptions taken in conjunction with the accompanying drawings, in which:

FIGS. 3A-3C illustrate three exemplary cases of interpolation;

FIGS. 4A and 4B illustrate a crossing path and a doubling-back path, respectively;

FIG. 10B illustrates a calculation of preliminary parameters ΔxMIDDLE, ΔxLOWER, and ΔxUPPER when extension traces are doubling back in the higher-quality method embodiment;

Figure 13A:
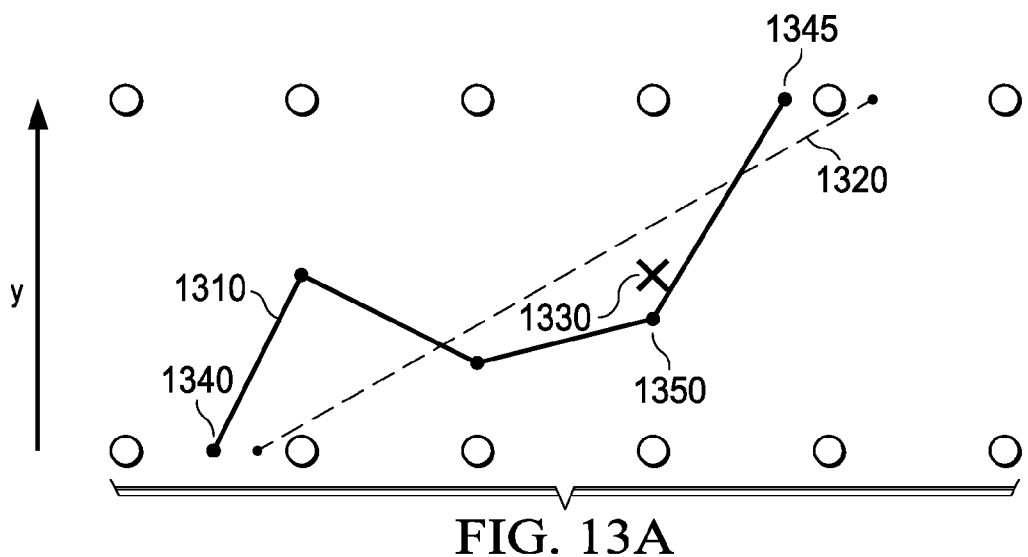
Figure 13B:
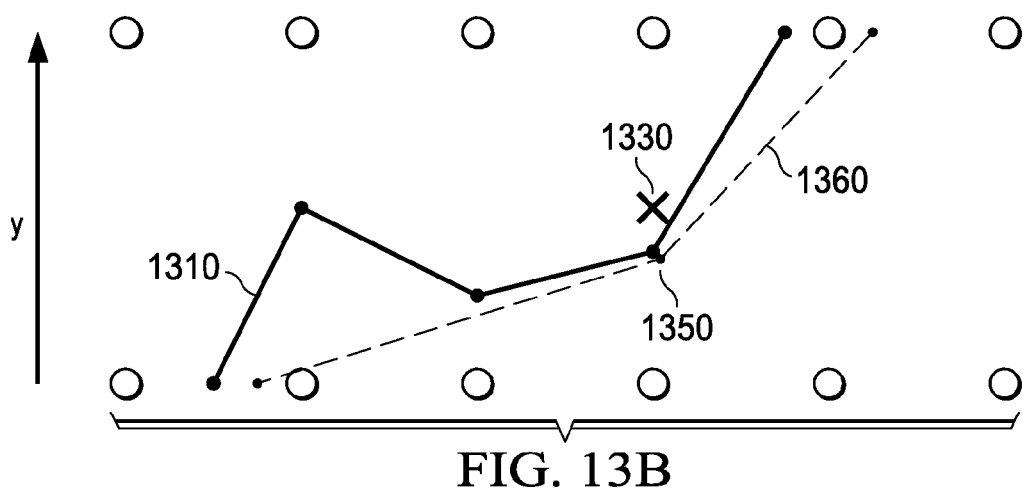
Figure 14A:
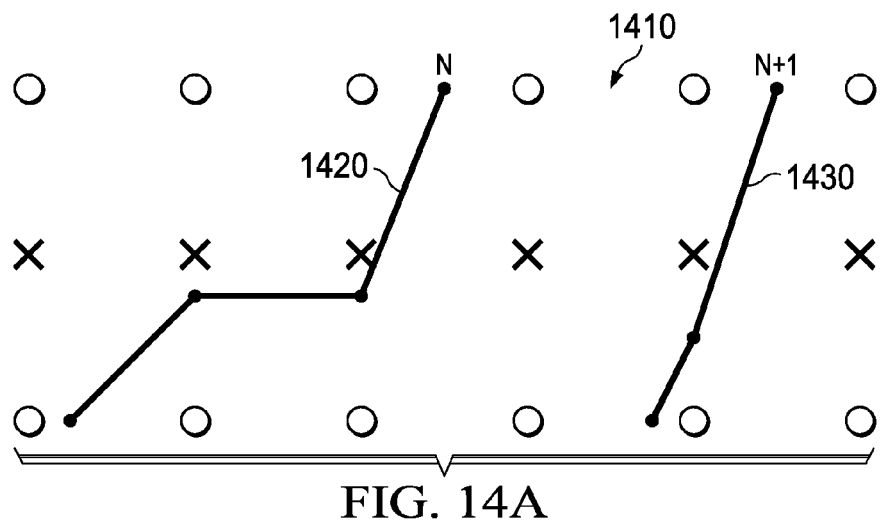
Figure 14B:
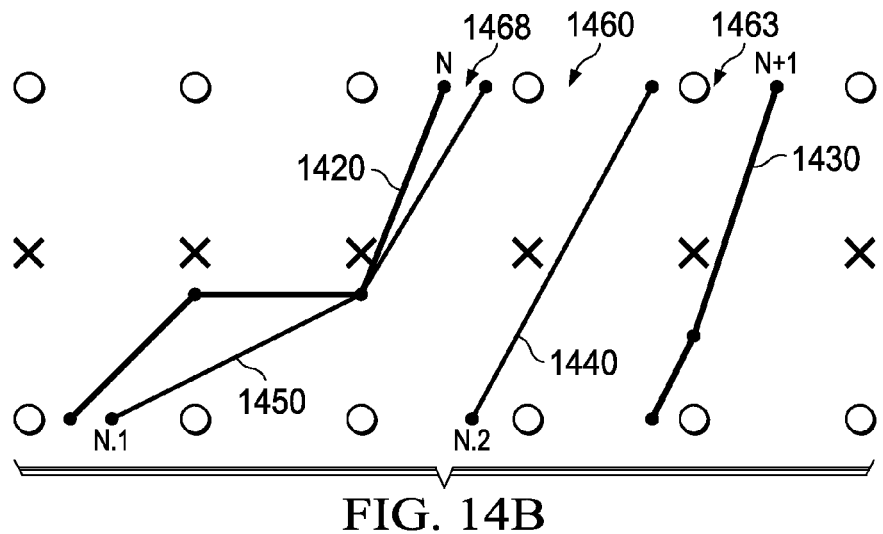
Figure 14C:
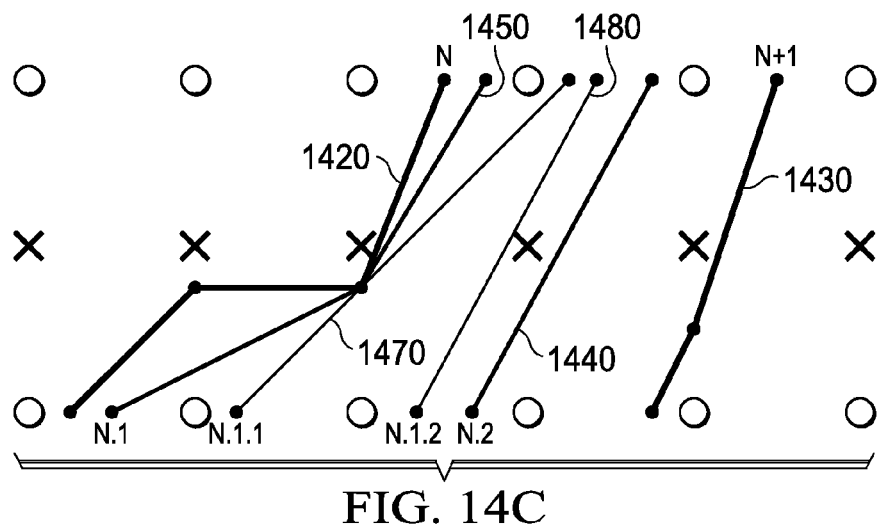
Figure 15A:
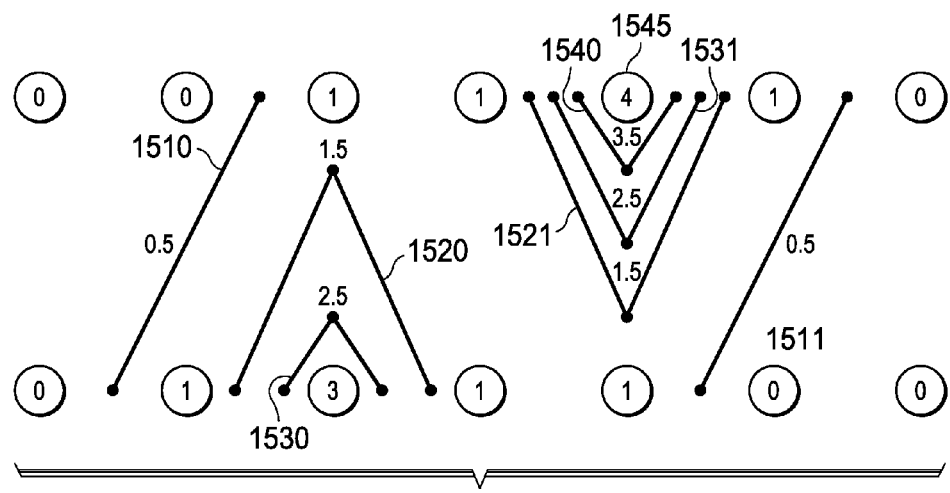
Figure 15B:
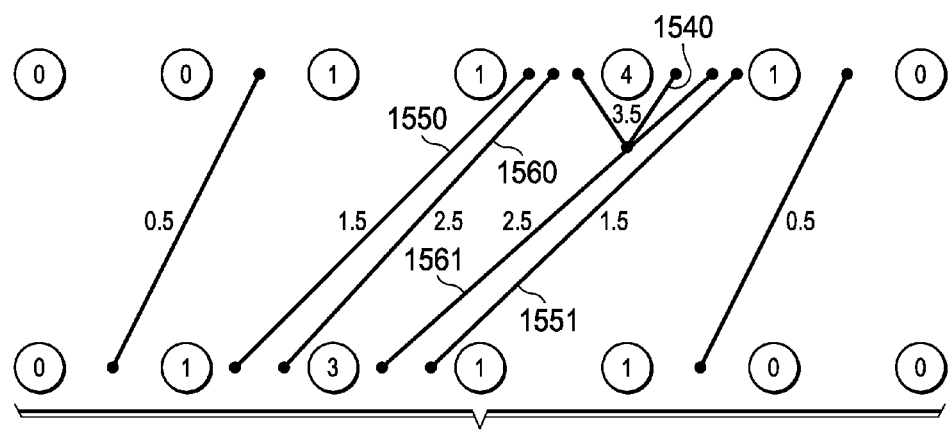
Figure 17A:
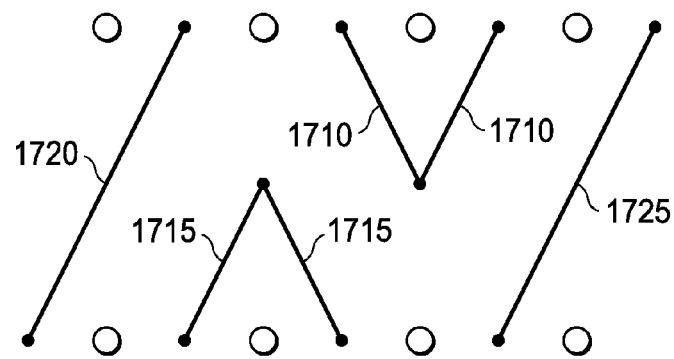
Figure 17B:
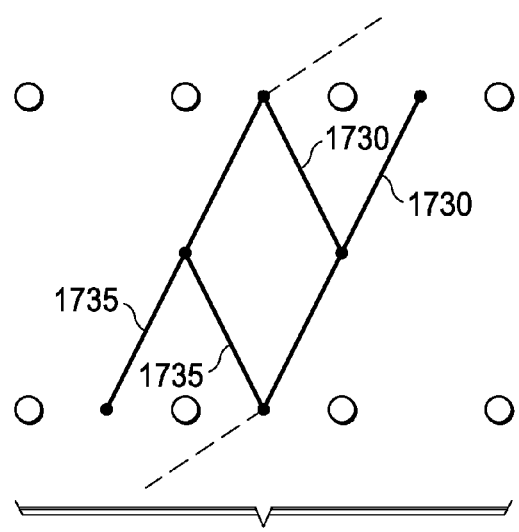
Figure 17C:
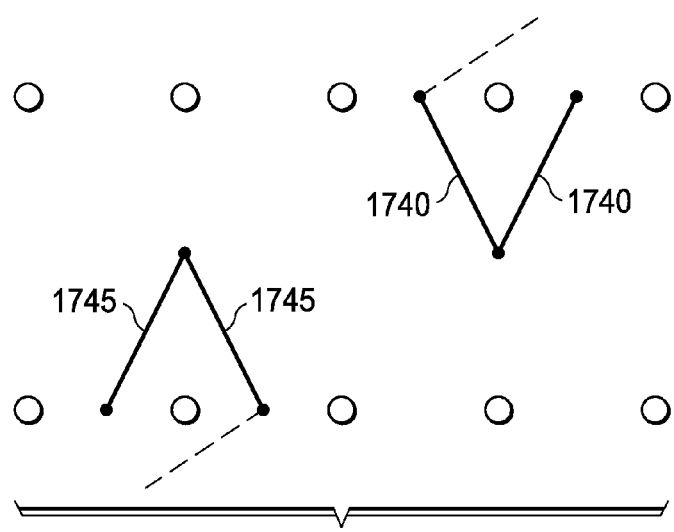
Figure 18:
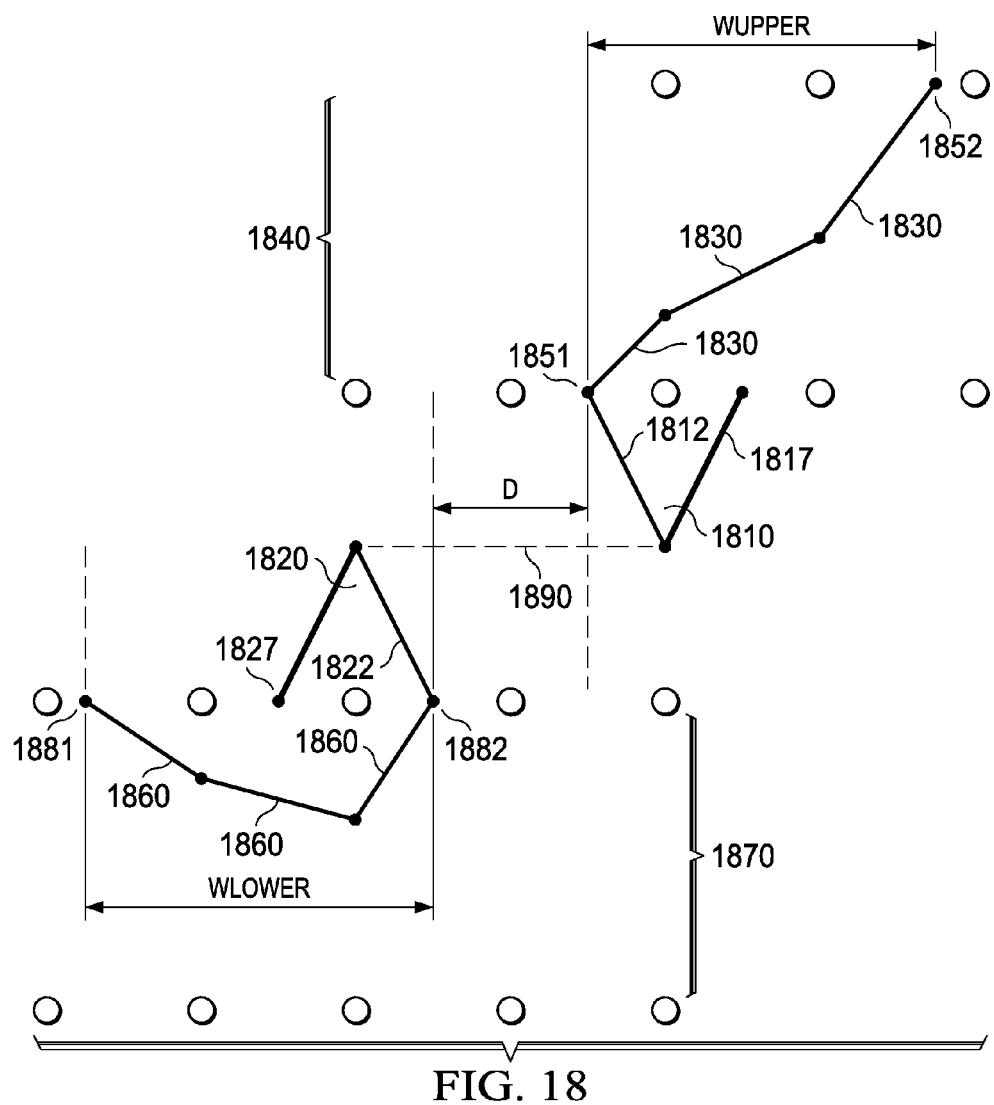
Figure 19A:
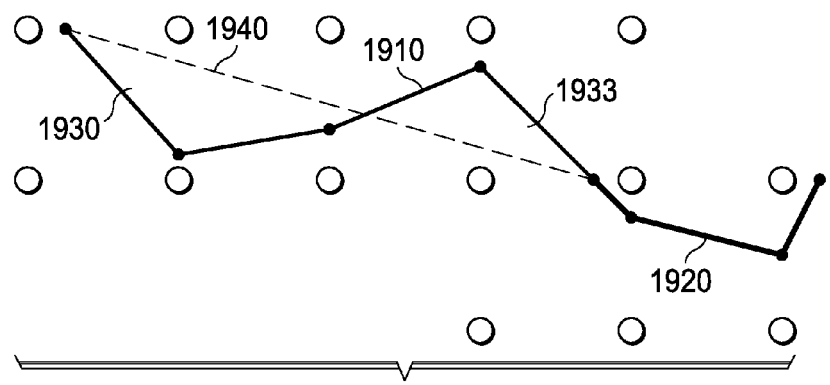
Figure 19B:
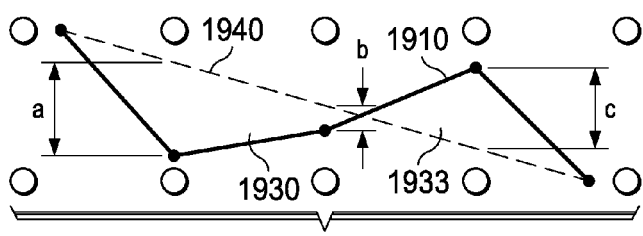
Figure 21A:
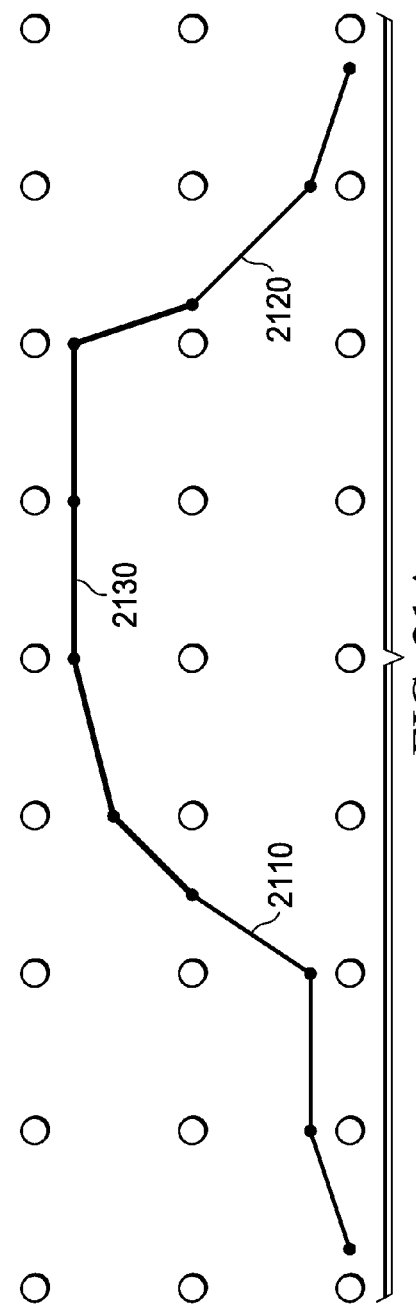
Figure 21B:
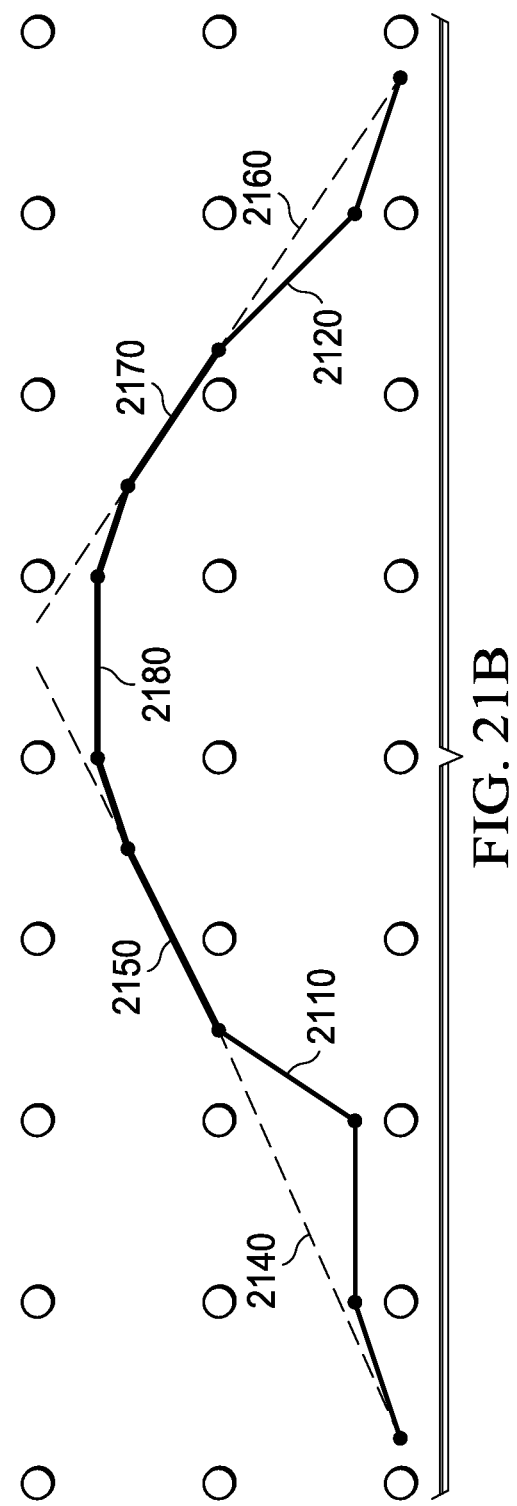
Figure 22:
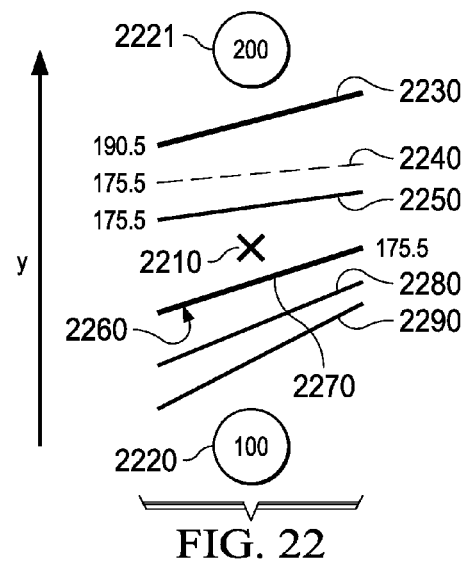
Figure 25A:
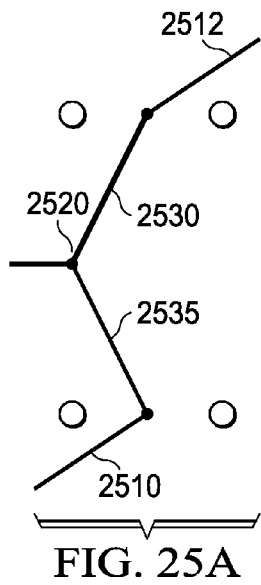
Figure 25B:
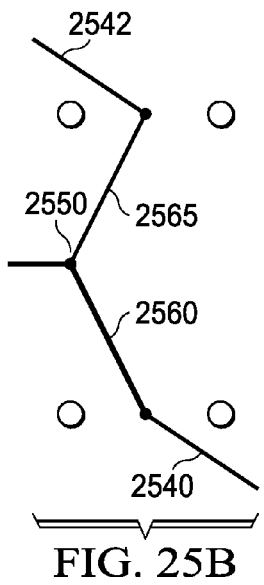
Figure 25C:
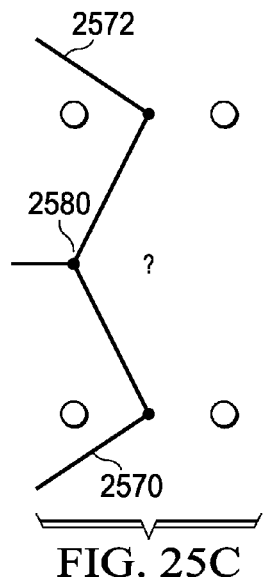
Figure 27:
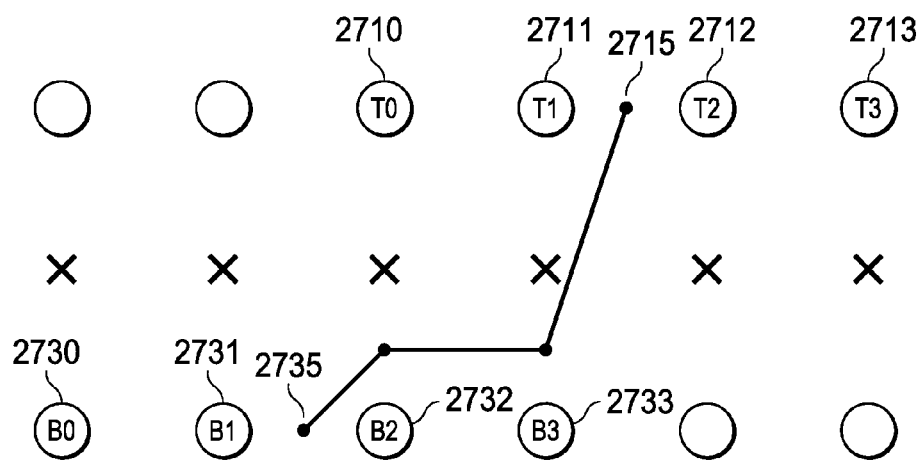
Figure 28:
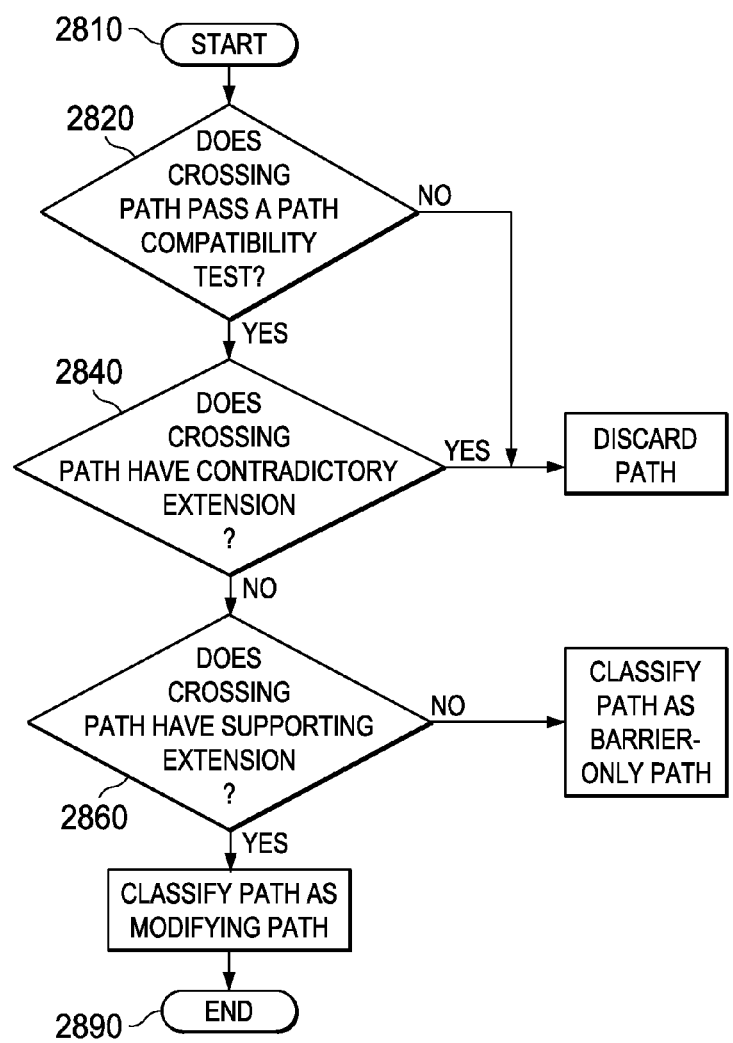
Figure 29:
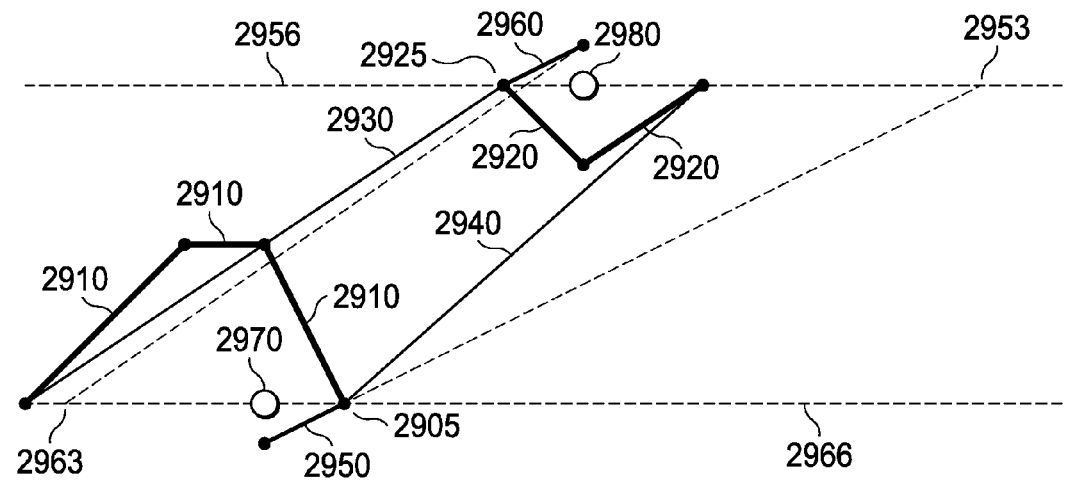
Figure 30:
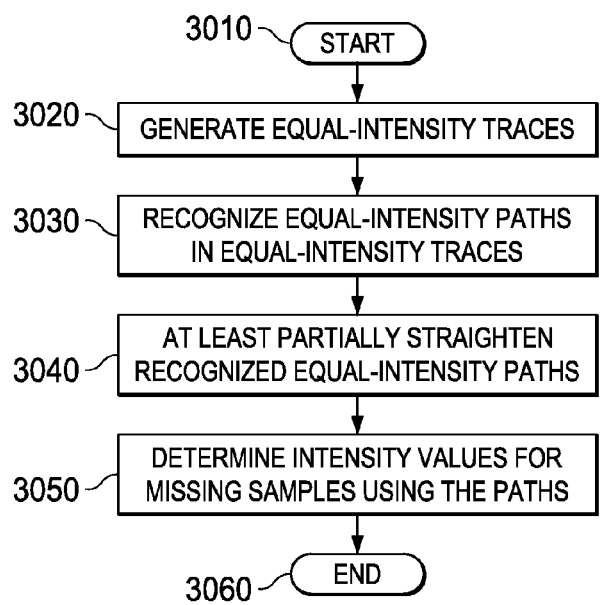

FIGS. 11A-D illustrate a calculation of a roughness parameter in the higher-quality method embodiment;

FIGS. 12A-D illustrate exemplary results of a conditional straightening procedure in the higher-quality method embodiment;

FIGS. 13A and 13B illustrate elimination of coarse path crossing in a recording step in the higher-quality method embodiment;

FIGS. 14A-14C illustrate a recursive process for identifying fine paths in the higher-quality method embodiment;

FIG. 15A illustrates exemplary parent and doubling-back paths targeted by a simple bridging technique in the higher-quality method embodiment;

FIG. 15B illustrates the result of applying a simple bridging technique to the paths of FIG. 15A;

FIGS. 16A-E illustrate a technique for resolving a diamond-ambiguity based on the complementarity of extending traces in the higher-quality method embodiment;

FIGS. 17A-C illustrate exemplary patterns addressed by a simple bridging technique, a diamond-ambiguity technique, and a complex bridging technique, respectively, in the higher-quality method embodiment;

FIG. 18 illustrates a width test of a complex bridging technique in the higher-quality method embodiment;

FIGS. 19A and 19B illustrate an example of a calculation and an approximation, respectively, used to determine if a trace is mostly concave in the higher-quality method embodiment;

FIGS. 20A-20E illustrate application of a final finishing technique to exemplary patterns, in the higher-quality method embodiment;

FIGS. 21A and 21B illustrate a path before and after the clipping process of the final finishing technique in the higher-quality method embodiment;

FIG. 22 is an exemplary illustration of the recording process for doubling-back fine paths for a missing sample point in the higher-quality method embodiment;

FIGS. 23A-F illustrate exemplary paths and ambiguities used in a simplified method embodiment;

FIGS. 24A-D illustrate the classification of extending traces used in the simplified method embodiment;

FIGS. 25A-C illustrate resolution of exemplary ambiguities in the simplified method embodiment;

FIGS. 26A-E illustrate exemplary supportive and contradicting extensions in the simplified method embodiment;

FIG. 27 illustrates a path compatibility test used in the simplified method embodiment;

FIG. 28 is a flow diagram illustrating a method for classification of crossing paths into modifying and barrier-only paths in the simplified method embodiment;

FIG. 29 illustrates direction and projection of extensions in an exemplary bridging case in the simplified method embodiment; and FIG. 30 is a flow diagram of one embodiment of a method for producing a frame from a field.

DETAILED DESCRIPTION

It is realized herein that due to aliasing, simple interpolation perpendicular to the horizontal lines in an interlaced field can result in image artifacts colloquially called "jaggies." It is further realized that methods based on identification of image edge directions involve their own trade-offs. In particular, it is necessary to examine large horizontal sections of the frame to detect nearly horizontal edges. Whether implemented through large operators in the case of gradient-based edge direction detectors or large correlation windows in the case of feature-matching edge direction detectors, the solution degrades the ability to resolve fine image details. Introduced herein are systems and methods that employ novel techniques for taking true image features into account in determining intensity values for missing samples, namely equal-intensity lines. Various embodiments of the novel systems and methods reduce "jaggies" and obviate the need for large search areas.

The embodiments described in detail herein generally employ lines of equal intensity as a basis for interpolating the intensity values of missing samples. For example, if system intensity values are represented by integers lying in a range between 0 and 255, equal-intensity lines may be drawn at half-integer values from 0.5 to 245.5 inclusive. In one embodiment, equal-intensity lines are straight lines drawn between equal-intensity points interpolated between present samples. One or more equal-intensity lines connected together form equal-intensity traces, and the traces are analyzed to identify paths representing likely image features.

Figure 1:
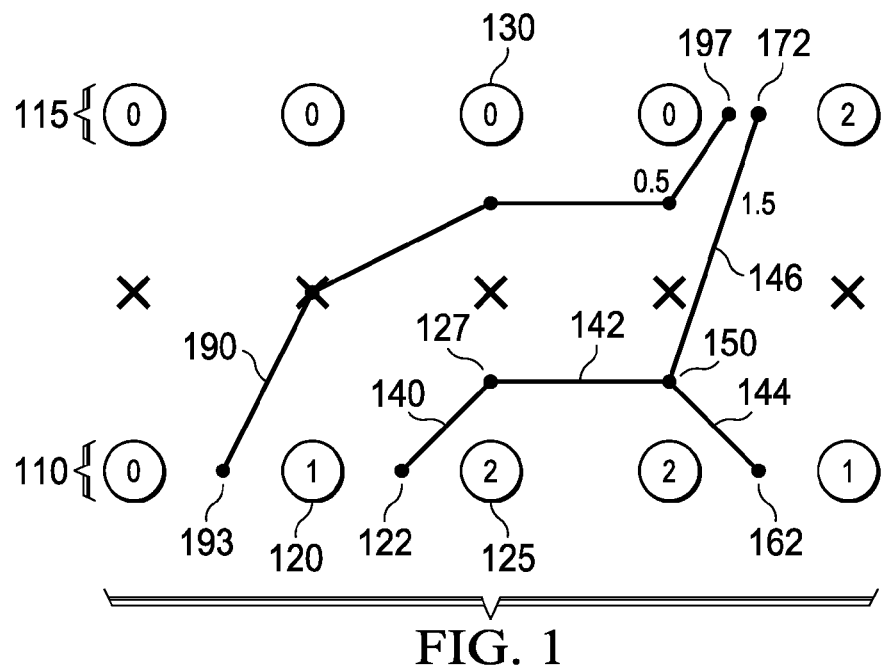
FIG. 1 illustrates exemplary equal-intensity traces in a portion of a frame of a video.

FIG. 1 illustrates exemplary equal-intensity traces in a portion of a frame. Present samples are located in a lower row 110 and an upper row 115, while missing samples are shown using the symbol "x." In one embodiment, linear interpolation between present samples 120, 125 yields an equal-intensity point 122 at an intensity value of 1.5, while linear interpolation between present samples 125, 130 yields an equal-intensity point 127, also at an intensity of 1.5. Together, the points 122, 127 define an equal-intensity line 140. Equal-intensity lines 140, 142, 144, 146 form an equal-intensity trace 150. A crossing point is a point at which a trace or a path crosses a row of present samples. In FIG. 1, the equal-intensity trace 150 intersects the lower row 110 at row crossing points 122, 162 and the upper row 120 at a row crossing point 172.

An equal-intensity path is an equal-intensity trace with only two crossing points. The path begins in a beginning crossing point and ends in an end crossing point. Henceforth, we will refer to equal-intensity traces and paths simply as traces and paths. A trace with more than two crossing points may be interpreted to include multiple paths. For example, the trace 150 may be interpreted as including a first path consisting of equal-intensity lines 140, 142, 146, as well as a second path consisting of equal-intensity lines 140, 142, 144. Not all paths represent true image features (i.e. patterns, shapes or figures) that exist in the image. A path may contain segments simply reflecting noise or aliasing.

In an embodiment, a recognized path is a path that is likely to reflect a true image feature. If it is not clear if a path is likely to reflect a true image feature, the path is not recognized. A path may be recognized through selection from a larger set of paths, or through bridging other paths together. Only recognized paths are then used to determine intensity values at missing sample points. Various conditions and tests are described herein as embodied methods for recognizing a path.

Figure 2:
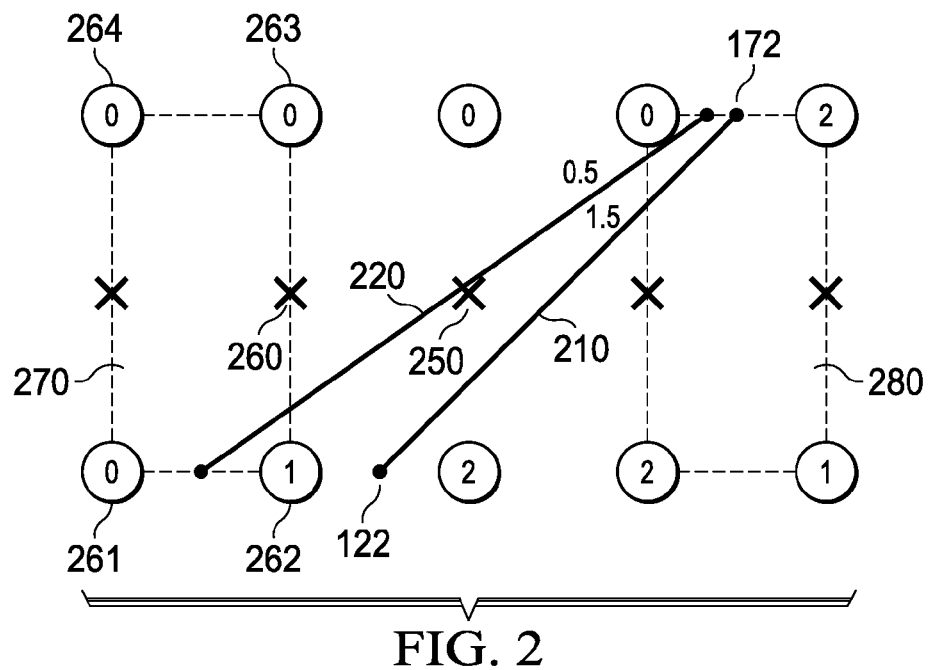
FIG. 2 illustrates exemplary equal-intensity paths in the frame portion of FIG. 1.

In FIG. 1, the existence of both crossing points 162, 172 represents an ambiguity as to whether the path traveling upward and ending at the crossing point 172 or the path traveling downward and ending at the crossing point 162 should be recognized. No such ambiguity exists for an equal-intensity trace 190 drawn at an intensity of 0.5, the beginning and end points of which are points 193, 197. As a result, the equal-intensity trace 190 may be directly recognized as also an equal intensity path. FIG. 2 illustrates exemplary paths in the frame portion of FIG. 1. FIG. 2 assumes that the ambiguity in FIG. 1 is resolved in favor of recognizing the path consisting of lines 140, 142, 146 of FIG. 1, ending at the crossing point 172. In embodiments, recognized paths are at least partially straightened. Straightening, described in detail below, may range from no straightening to full or maximal straightening. In FIG. 2, the path recognized between crossing points 122, 172 has been fully straightened, resulting in the path 210. Also shown in a maximally straightened path 220 at the intensity value of 0.5.

A unit cell is the smallest rectangle formed by four present samples, two each in two rows. For example, present samples 261, 262, 263, 264 define a unit cell 270. The path 220 begins and ends in two different unit cells 270, 280.

In an embodiment, once paths have been recognized and at least partially straightened, intensity values for the missing samples are determined using the paths and their intensity values. Where only a single system intensity level exists between the intensity values of two paths, the intensity value of the missing sample may be determined by simply noting between which straightened paths it lies. In the example of FIG. 2, since only a single system intensity level of 1 exists between the intensity values of the straightened paths 220, 210, 0.5 and 1.5, the intensity value at a missing point 250 lying between them may be assigned a value of 1. A missing point 260 may be assigned a value of zero, since it lies on the low side of the straightened path 220 at the intensity value 0.5. Where more than one system intensity level exists between paths, an embodiment employs interpolation. FIGS. 3A-3C illustrate three exemplary cases of such interpolation. In FIG. 3A, there are no paths between a missing sample 310 and two present samples 312, 314. In the present embodiment, the intensity value at the missing sample 310 is obtained through linear interpolation between the present samples 312, 314. In FIG. 3B, a path 330 exists between a missing sample 340 and a present sample 342. In the present embodiment, the intensity value at the missing sample 340 is obtained through linear interpolation between the path 330 and a present sample 344. The path 330 is herein referred to as a modifying path, since its presence modifies the interpolation and thus the interpolated value for the missing sample 340. Modifying paths begin and end in two different unit cells. The path 330, for example, begins and ends in the unit cells located either immediately or somewhere to the right and left of samples 342, 244. In FIG. 3C, two paths 350, 360 exist between a missing sample 370 and two present samples 372, 374. In an embodiment, the intensity value at the missing sample 370 is obtained through linear interpolation between the paths 350, 360, both of which are modifying paths.

In other embodiments, equal-intensity lines may be drawn at values other than half-integer ones. For example, to obtain a frame with a 10-bit intensity map from a field with an 8-bit intensity map, it may be beneficial to use equal-intensity lines more finely spaced in intensity, to allow determination of missing sample values to the finer resolution of the 10-bit intensity map. In addition, equal-intensity lines more coarsely spaced in intensity may be used to trade off image quality for speed.

Embodiments involve recognizing crossing and doubling-back paths. FIGS. 4A and 4B illustrate a crossing path and a doubling-back path, respectively. A crossing path is a path that crosses the lower and upper rows of present samples once each. FIG. 4A illustrates a crossing path 410. A doubling-back path is a path that turns back on itself, crossing only one of the lower and upper rows of present samples twice. FIG. 4B illustrates a doubling-back path 420.

Two general method embodiments for recognizing equal-intensity paths in equal-intensity traces and at least partially straightening them will be described in detail. A higher-quality method embodiment will be described first, which typically offers missing-sample intensity values that more accurately reflect true image features. A simplified method embodiment will then be described. The simplified embodiment typically offers simplified processing and lower memory usage. These general embodiments are merely two embodiments of the present invention. Numerous variations associated with alternative embodiments will also be described.

Figures 5A, 5B, 5C:
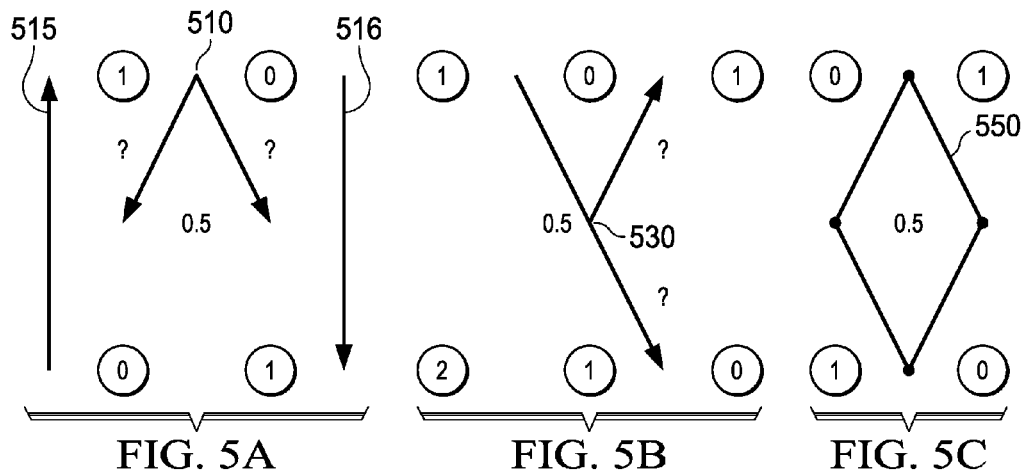
FIGS. 5A-5C illustrate exemplary diamond ambiguities in a higher-quality method embodiment.

The higher-quality method embodiment will now be described. FIGS. 5A-5C illustrate exemplary diamond ambiguities considered in the higher-quality method embodiment. In FIG. 5A, an ambiguity exists at the beginning 510 of the trace as to whether a path turning to the right or to the left should be recognized. Diamond ambiguities occur when the directions of intensity gradients between present samples are different. Gradients 515, 516 reflect this observation. In FIG. 5B, the ambiguity occurs at the end 530 of the trace, making it unclear whether a crossing path or a doubling-back path should be recognized. Diamond ambiguities take their name from the diamond-shaped trace 550 in FIG. 5C, where multiple ambiguities have occurred.

The higher-quality method embodiment includes recognizing paths in multiple passes for each row of missing samples, starting with a coarse pass to recognize course paths, following by an iterative series of fine passes to recognize fine paths between adjacent pairs of coarse paths. Coarse paths are paths meeting a series of requirements described below. Coarse paths are used as anchors in the search for fine paths. Therefore, stringent requirements are placed on them to have high confidence that they represent the true features of the image. Fine paths are paths recognized between coarse paths to further refine the intensity interpolation.

In the coarse pass, each possible path is traced downward from the upper of the two rows of present samples. Each path is traced in turn, starting from the leftmost path within the gap between the two leftmost present samples on the upper row, and continuing until the right edge of the image is reached. The goal of the algorithm is to bound every missing sample by two coarse paths, one on the left and one on the right. Many missing samples may be bounded by a given pair of coarse paths. A path is recognized as a coarse path if: (1) it is a crossing path, (2) it passes a feature-matching test, and (3) it passes a path-continuity test if the beginning and end of the path are not within a single unit cell. The latter condition is not required if the path does not leave a single unit cell. Embodiments of the feature-matching and path-continuity tests will now be described.

Feature matching is a method to assess the compatibility of intensity profiles at the beginning and end points of a path. If, for example, the horizontal intensity profile of present sample around a crossing point is similar, within some tolerance, to that around another crossing point, it may be stated that the two profiles are compatible. There is then some confidence that the path represents the shifting of a true feature of the image along the path from its beginning crossing point to its end crossing point.

Figure 6:
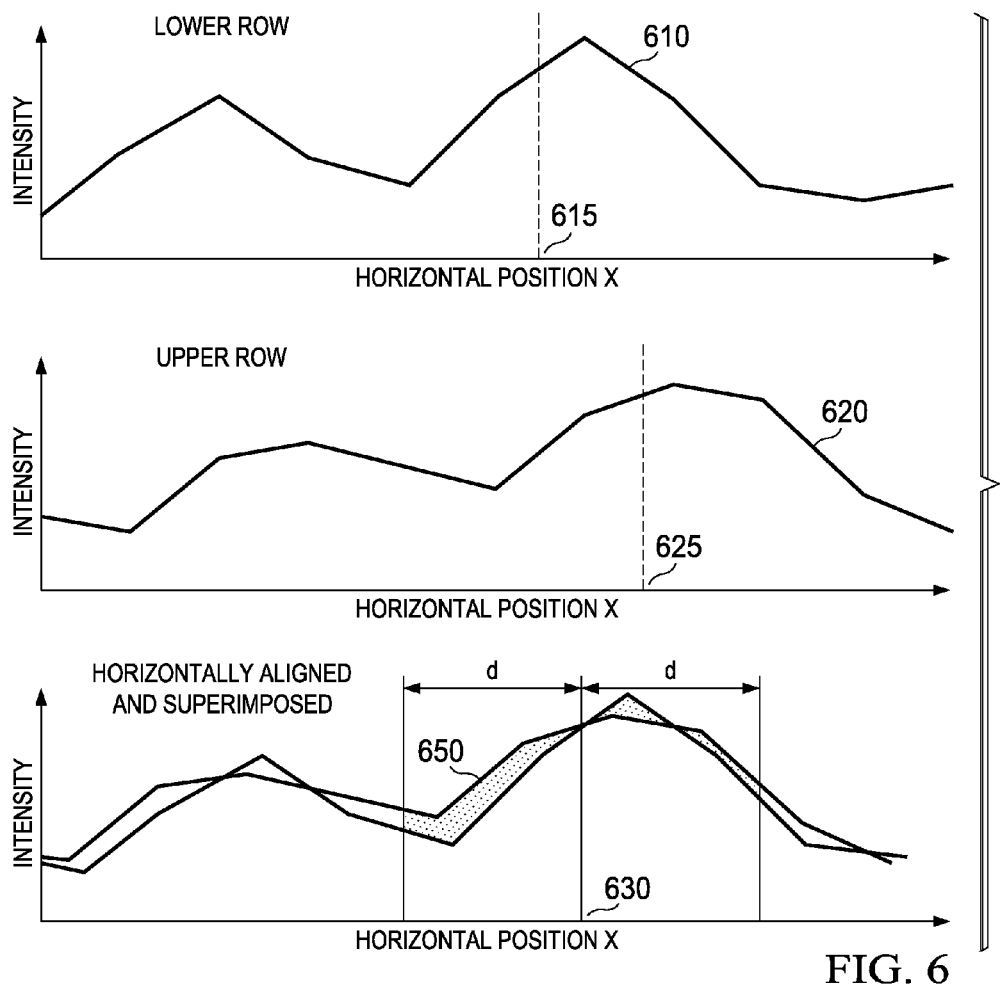
FIG. 6 illustrates aspects of a feature-matching test in the higher-quality method embodiment.

FIG. 6 illustrates aspects of a feature-matching test in the higher-quality method embodiment. Continuous intensity functions 610, 620 are obtained from the intensity values of present samples located in the lower and upper rows by linear interpolation. The path's crossing points with the lower and upper rows are located at points 615, 625. Referring to FIG. 1, points 193, 197 of the trace 190 are examples of points 615, 625 in FIG. 6. Next, functions 610, 620 are horizontally aligned and superimposed, such that both points 615, 625 now lie at point 630. The feature error of the two functions is defined as the area 650 between functions 610, 620, within a distance d on either side of the point 630. For example, d may be set to twice the horizontal distance between two present sample points, thereby creating a four-sample-wide comparison window centered on the crossing points. In the area calculation, we define the unit system such that an area of 1 results from a width of one horizontal sample spacing and a height of one discrete intensity level.

In areas of large intensity contrast, small alignment differences can cause large feature errors. An error tolerance is used to normalize the raw feature error for contrast difference. To calculate an error tolerance for an intensity function f, we take the maximum of two feature errors, those of the function f with itself but misaligned by +/− one half of the horizontal sample distance:

Error Tolerance=Max{Feature Error[$f(x),f(x+0.5)$], Feature Error[$f(x),f(x-0.5)$]}.

The normalized feature error is the mismatch score, calculated by dividing the feature error by the minimum of the error tolerances for the intensity functions of the lower and upper rows:

Mismatch Score=Feature Error/Min(Error Tolerance of Lower-Row Function,Error Tolerance of Upper-Row Function).

In an embodiment, a path passes the feature-matching test if the mismatch score is no larger than four and the minimum of the error tolerances for the lower and upper rows is not less than two. A minimum condition on error tolerances is adopted because low error tolerances imply a featureless area of the image, where any paths recognized by the test may not reflect true image features.

Figure 7A:
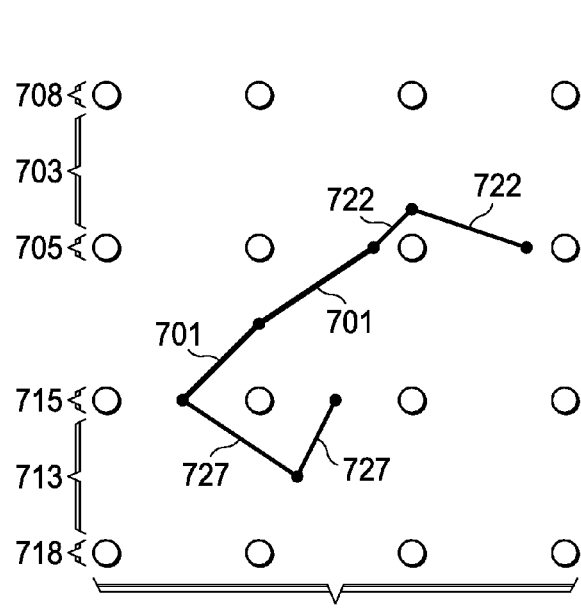
FIGS. 7A and 7B illustrate respective first and second rules of a path-continuity test in the higher-quality method embodiment.

In the higher-quality method embodiment, in addition to passing the feature-matching test, a coarse path must also pass a path-continuity test if its beginning and end points are not within a single unit cell. The path-continuity test is designed to ensure that the path's trace extends into rows above and below in a consistent manner. This helps avoid designating coarse paths in areas of angled textural periodicity, where paths often rapidly change direction. The test consists of four rules. First, if the trace doubles back, it must maintain the same horizontal direction as the path. FIG. 7A illustrates the first rule of a path-continuity test in the higher-quality method embodiment. A path 701 is the subject of the test. An upper gap 703 is defined as the area between a row 705 of upper present samples and a row 708 of present samples further above the row 705. A lower gap 713 is defined as the area between a row 715 of lower present samples and a row 718 of present samples further below the row 715.

Figure 7B:
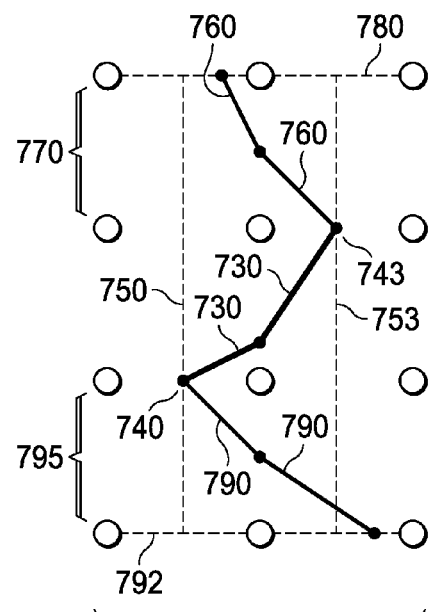

A trace 722 extending the path 701 into the upper gap 703 doubles back, but maintains the same horizontal direction as that of the path 701. In contrast, a trace 727 in the lower gap 713 doubles back in a horizontal direction opposite to that of the path 701. Path 701 fails the test due to the trace 727. Second, if the trace is itself a crossing trace, it must maintain the horizontal direction of the path. If it does not, it must cross within the horizontal limits of the path. FIG. 7B illustrates the first rule of a path-continuity test in the higher-quality method embodiment. Horizontal limits of a path 730 are defined by points 740, 743 and shown using lines 750, 753. A trace 760 extending the path 730 into an upper gap 770 does not maintain the rightward direction of the path 730, but it does cross the upper edge 780 of the upper gap 770 within the horizontal limit line 750 of the path 730. By contrast, a trace 790 fails to maintain the leftward direction of the path 730 and crosses the lower edge 792 of the lower gap 795 outside the horizontal limit 753 of the path 730. Path 730 fails the test due to the trace 790. Third, if the trace extending the path begins with a diamond ambiguity, the path passes the test. This is because the trace offers support to either the direction the path might have. Fourth, if the trace extending the path ends with a diamond ambiguity, it is treated as a crossing trace and the second rule is applied.

Figure 8:
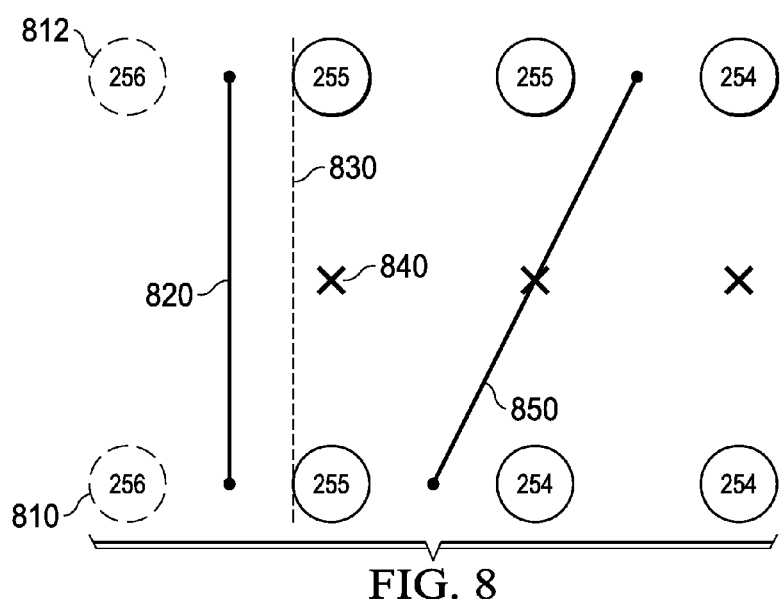
FIG. 8 illustrates a treatment of a left edge of a row of missing samples in the higher-quality method embodiment.

In an embodiment, the field is considered to have additional present samples at row edges to ensure that missing samples at row edges are bounded by coarse paths on both sides. FIG. 8 illustrates a treatment of a left edge of a row of missing samples in the higher-quality method embodiment. Additional present samples 810, 812 are considered to exist, with an intensity value one discrete level higher than the maximum system value, for example 256 for a system range of 0 to 255. When samples 810, 812 are included, the procedures described above will produce a coarse path 820 at an intensity level of 255.5, just outside an edge 830. As a result, an edge missing samples 840 is bounded on both sides by coarse paths 820, 840. In an embodiment, this edge treatment is implemented by over-fetching from the sample array and using a value of 256 for the resulting out-of-bounds fetches.

Figure 9:
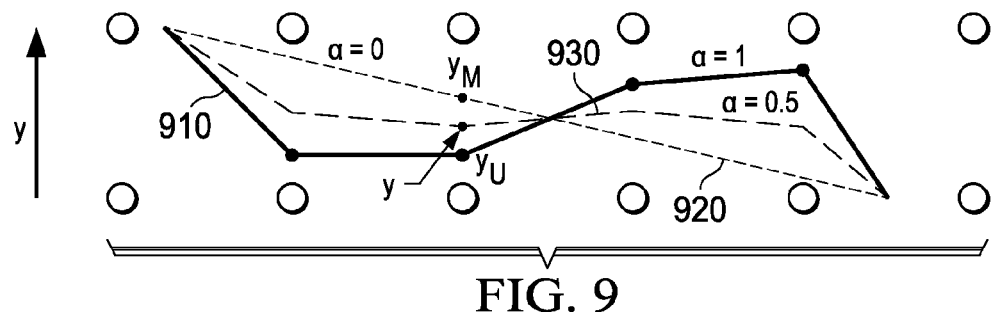
FIG. 9 illustrates the impact of a straightening parameter on straightening in the higher-quality method embodiment.

In the higher-quality method embodiment, recognized coarse paths undergo conditional straightening. Conditional straightening refers to not straightening all paths to the same degree, including maximally straightening, partially straightening, and not straightening at all. In one embodiment of conditional strengthening, paths are strengthened aggressively if they are likely crooked due to aliasing, but not if they are likely crooked due to true features in the image. In one embodiment, such conditional straightening is achieved by embedding these considerations into a straightening parameter $0 \leq \alpha \leq 1$. FIG. 9 illustrates the impact of the straightening parameter on straightening in the higher-quality method embodiment. An unstraightened path 910 is first maximally straightened to produce path 920. Conditionally straightened path 930 is then obtained using the formula $$y = y_U \cdot \alpha + y_M \cdot (1-\alpha),$$

where $y_U$, $y_M$, and $y$ are the y coordinates of points on the unstraightened, maximally straightened, and conditionally straightened paths, respectively, at any horizontal location. The larger $\alpha$, the less strongly the path is straightened. Paths that are crooked due to aliasing are more likely to have supporting extending traces in at least one of the rows above and below them. This observation is incorporated into the calculation of $\alpha$, as described below.

Figure 10A:
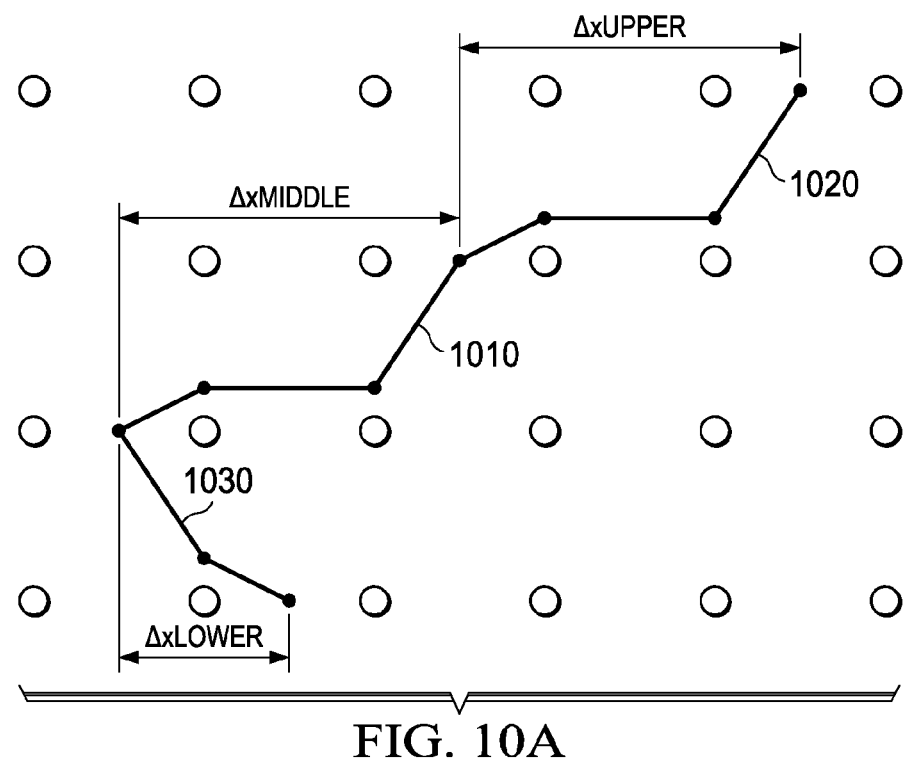
FIG. 10A illustrates a calculation of preliminary parameters ΔxMIDDLE, ΔxLOWER, and ΔxUPPER when extension traces are crossing in the higher-quality method embodiment.

FIG. 10A illustrates a calculation of preliminary parameters ΔxMIDDLE, ΔxLOWER, and ΔxUPPER when extension traces are crossing, in the higher-quality method embodiment. ΔxMIDDLE, ΔxLOWER, and ΔxUPPER are the horizontal widths of a path 1010, a lower extension trace 1020, and an upper extension trace 1030, respectively. FIG. 10B illustrates a calculation of preliminary parameters ΔxMIDDLE, ΔxLOWER, and ΔxUPPER when extension traces are doubling back, in the higher-quality method embodiment. As in the case above, ΔxMIDDLE is the horizontal width of a path 1040. However, ΔxUPPER is the horizontal distance between an upper crossing point 1050 of the path 1040 and a point 1052 at which a straight line 1054 drawn between the point 1050 and a peak point 1056 crosses the upper edge 1058 of the upper gap 1060. The peak point 1056 is the point at which the doubling-back trace 1070 reaches the maximum vertical distance from its starting edge 1072. ΔxLOWER is calculated in a similar manner. In FIG. 10B, points 1080, 1082 are both at the same maximum distance from the edge 1084. In such a case, the point 1080, horizontally closer to the crossing point 1090, is selected as the peak point. Width values are in units of the horizontal sample spacing.

$\alpha$ is now calculated as $$\alpha = [M_{\Delta X} - \max(U_{\Delta X}, L_{\Delta X})]/M_{\Delta X},$$

where $$M_{\Delta X} = \min(8, \Delta x\text{MIDDLE}),$$

and $U_{\Delta X}$ is given by $$U_{\Delta X} = \min(\Delta x\text{UPPER}, M_{\Delta X}),$$

except that it is set to zero if the upper extending trace is in the horizontal direction opposite to that of the path. In the latter case, the upper trace offers no support for the path. Similarly, $L_{\Delta X}$ is given by $$L_{\Delta X} = \min(\Delta x\text{LOWER}, M_{\Delta X}),$$

except that it is set to zero if the lower extending trace is in the horizontal direction opposite to that of the path. The widths of the extending traces are considered relative to the width of the path, as evidenced by the division by $M_{\Delta X}$ in the equation for $\alpha$. When there is little or no support from either the upper or lower extending traces, both $U_{\Delta X}$ and $L_{\Delta X}$ are much smaller than $M_{\Delta X}$, $\alpha$ is close to one, and straightening is weak. Limiting $M_{\Delta X}$ to 8 sample spacings ensures that much wider paths are strongly straightened with the overly stringent requirement that extending traces be equally as wide.

Figures 11A, 11B:
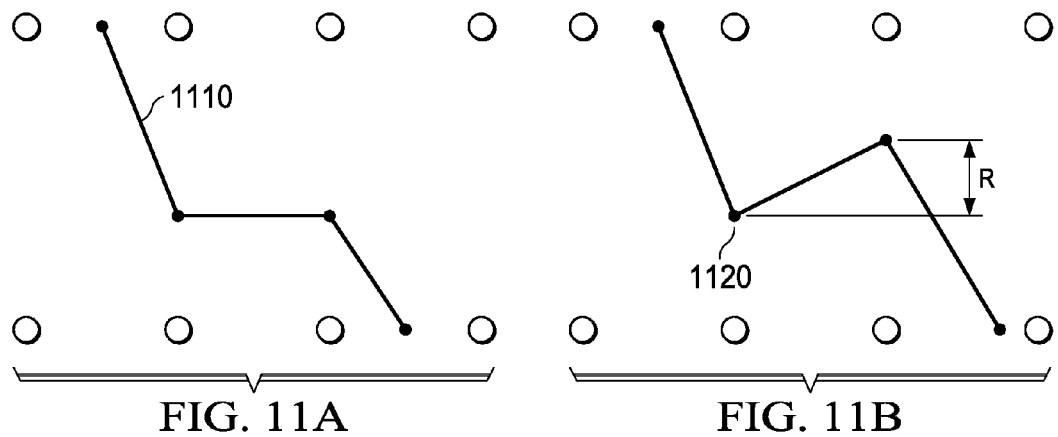
Figure 11C:
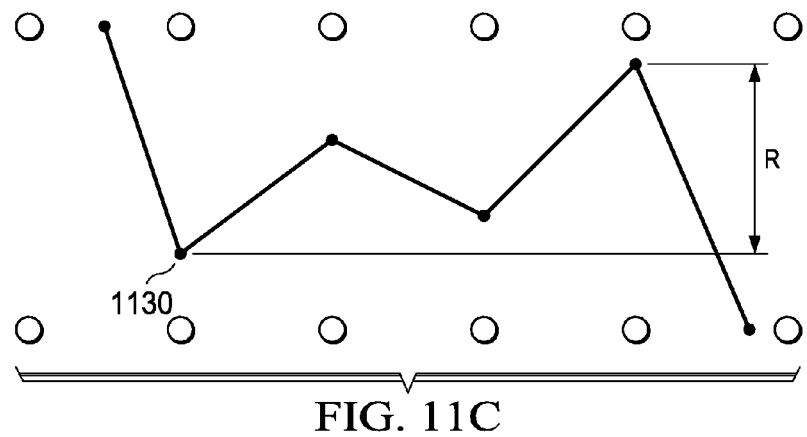
Figure 11D:
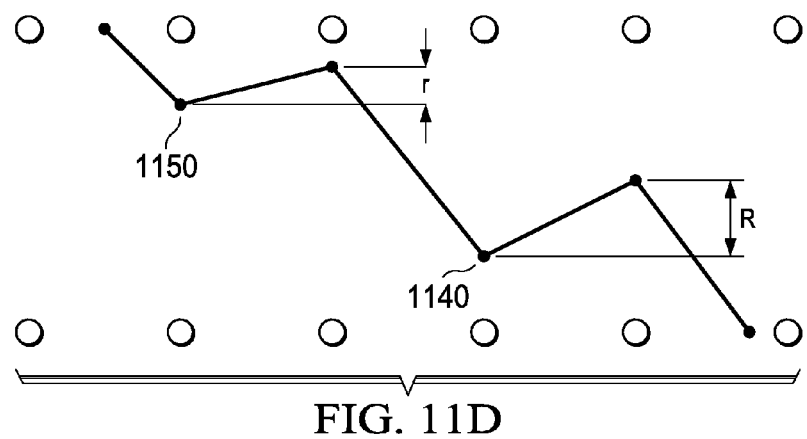

Paths that are strongly crooked are more likely to reflect true image features and should not be aggressively straightened. This observation is incorporated into the straightening procedure by limiting $\alpha$ calculated above to be no smaller than a roughness parameter R. FIGS. 11A-D illustrate a calculation of a roughness parameter in the higher-quality method embodiment. A completely smooth crossing path has a vertical component which moves in one direction only, continuously making progress towards the other side without giving back any of its vertical progress. In FIG. 11A, a path 1110 is completely smooth and R=0. Roughness parameter R is the maximum distance given back from and subsequent to any point on the trace, in units of the vertical spacing between upper and lower present sample rows. In FIG. 11B, R is the maximum distance given back from a point 1120. In FIG. 11C, R is the maximum distance given back from and subsequent to a point 1130. In FIG. 11D, R is the maximum distance given back from a point 1140, because the distance r given back from a point 1150 is smaller. Restricting $\alpha$ to values no smaller than R ensures that strongly crooked paths are not straightened aggressively, as R is large for such paths.

Figure 12A:
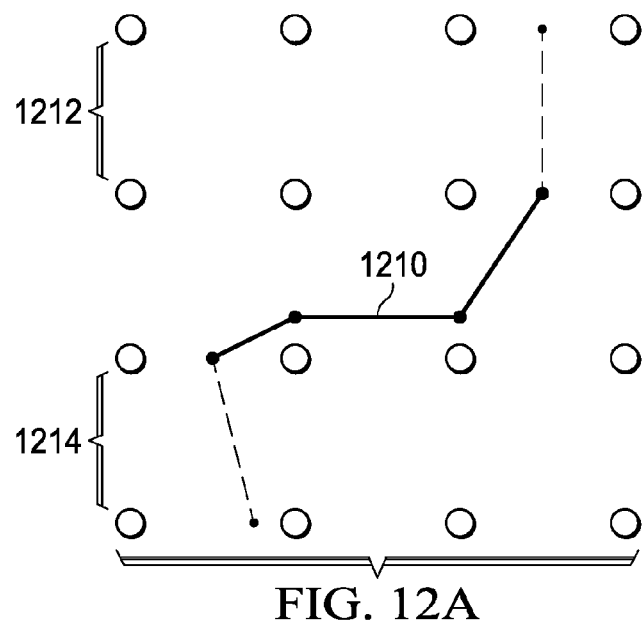
Figure 12B:
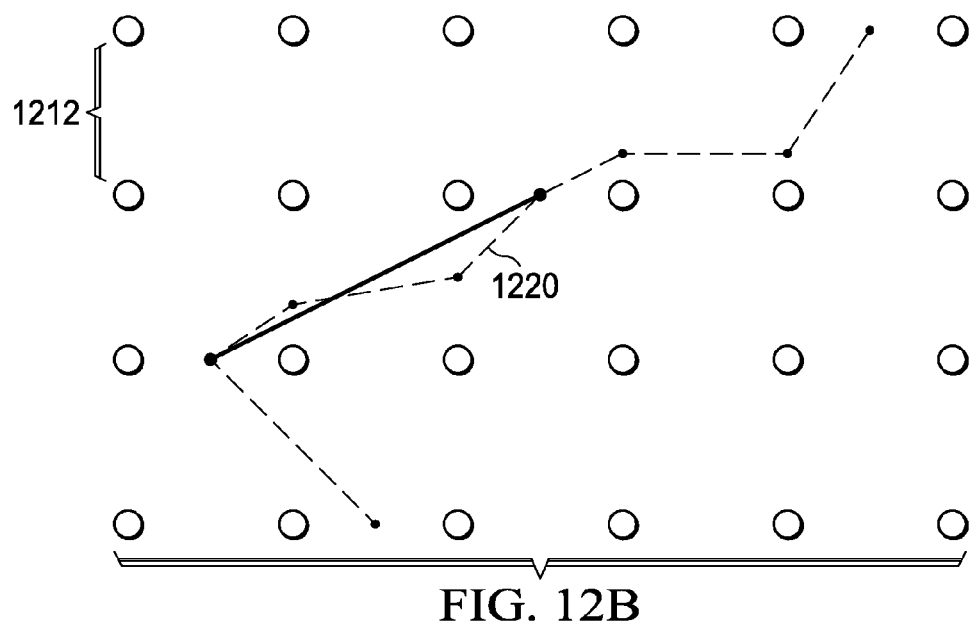
Figure 12D:
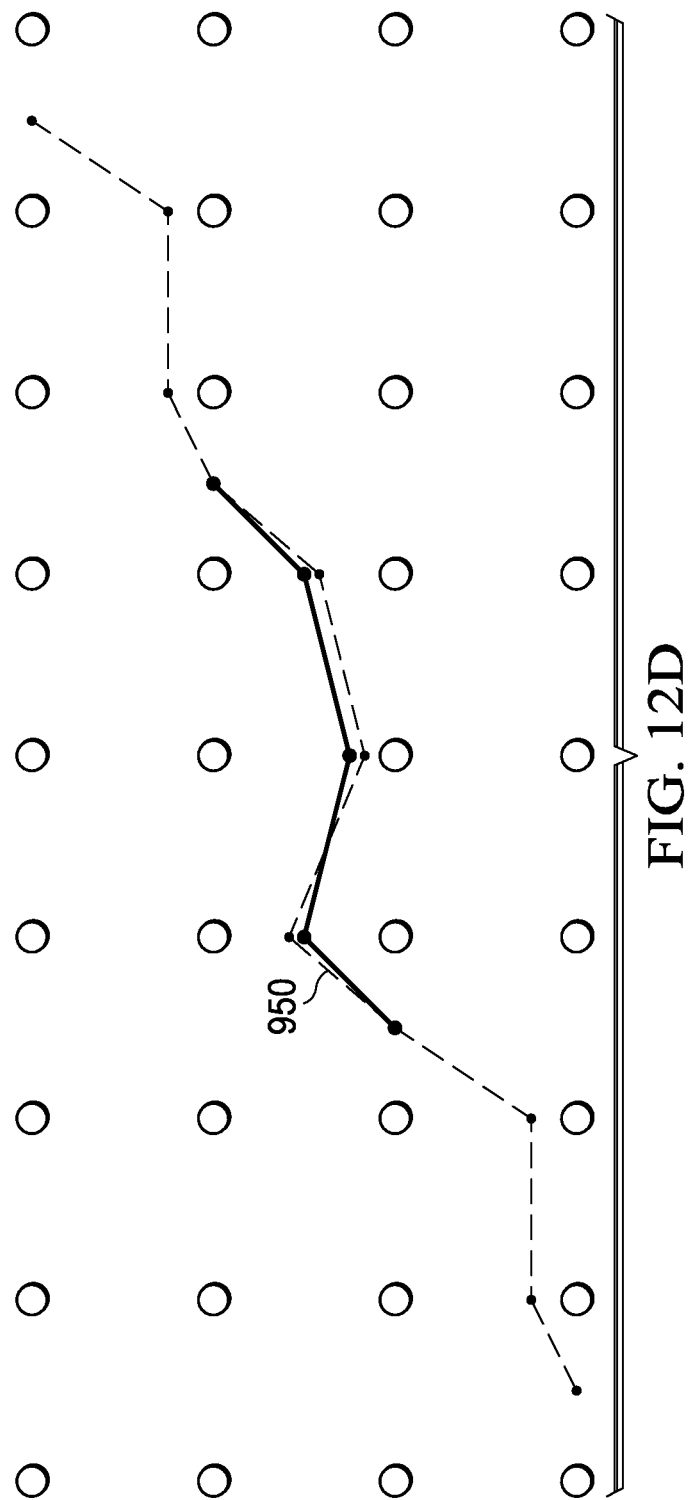

FIGS. 12A-D illustrate exemplary results of a conditional straightening procedure in the higher-quality method embodiment. In FIG. 12A, a path 1210 is not straightened as it lacks support in both the upper gap 1212 and the lower gap 1214. $U_{AX}$, $L_{AX}$ are both zero, ensuring that $\alpha=1$. In FIG. 12B, a path 1220 is maximally straightened, as strong support in the upper gap 1222 results in $U_{AX}=M_{AX}$. In FIG. 12C, a path 1320 is maximally straightened, as strong support in both upper and lower gaps 1322, 1423 results in $U_{AX}=L_{AX}=M_{AX}$. In other examples, partial straightening may occur with $U_{AX}$ and $L_{AX}$ both smaller than $M_{AX}$. In FIG. 12D, a strongly crooked path 1240, probably reflecting a true image feature, is only weakly straightened. In this case, a large roughness parameter R has clamped $\alpha$ to a large value, reducing the strength of the straightening.

Once coarse paths have been recognized and conditionally straightened, they are recorded for each missing sample point. The recoding procedure also affords an opportunity to disallow coarse paths crossing each other. Whereas a collection of only unstraightened or only maximally straightened paths will not cross, paths with varying levels of straightening may. FIGS. 13A and 13B illustrate elimination of coarse path crossing in a recording step of an higher-quality method embodiment, in the higher-quality method embodiment. In this embodiment, coarse paths are recorded from left to right. In FIG. 13A, a path 1310 and a path 1320 are considered for recording for the missing sample point 1330. The path 1310 occurs before the path 1320 in the left-to-right processing order and crosses it. The path 1310 travels generally from the lower left to the upper right, as evidenced by the locations of the crossing points 1340, 1345. To avoid crossing the path 1310, the path 1320 must be modified to not pass above the point 1350. In FIG. 13B, a path 1360 has been so modified. When the path 1310 is recorded for the missing sample point, a serial number, its lower-left-to-upper-right direction and the y-coordinate of the point 1350 are recorded, indicating that any paths examined subsequently must pass at or below the recorded y-coordinate. Not all recognized paths need to be recorded. Given that the path 1360 does not pass above the point 1350, it does not affect the intensity interpolation for the missing point 1330 and is therefore not recorded. In this example, only the path 1310 is recorded.

In the higher-quality method embodiment, once coarse paths have been recorded, fine paths are recognized. Three techniques are used, in the other listed, to identify a fine path: the simple bridging technique, the diamond-ambiguity technique, and the complex bridging technique. A path found at an intensity value intermediate between those of two coarse paths divides the intensity range into two smaller ranges. The procedure is repeated recursively within each new intensity range, until either no intensity values are left between recognized paths or no paths are found at the remaining intensity values using the three techniques noted above. In the latter case, a final effort is made to identify paths in a final finishing pass. These procedures are described in detail below.

FIGS. 14A-14C illustrate a recursive process for identifying fine paths in the higher-quality method embodiment. Fine paths are always maximally straightened, except that they must not cross coarse paths. In FIG. 14A, an area 1410 is bounded by a coarse path 1420 with serial number N and a coarse path 1430 with serial number N+1. In the first fine pass shown in FIG. 14B, two fine paths 1440, 1450 are identified at intensity values between those of paths 1420, 1430, dividing the area 1410 of FIG. 14A into three new areas 1460, 1463, 1468 between them and the paths 1420, 1430. Paths 1440, 1450 may be considered children of the parent paths 1420, 1430 and are given serial numbers N.1 and N.2, respectively, reflecting their order in the recursive process. Path 1440 is maximally straightened without crossing paths 1420, 1430. Path 1450 is straightened to the extent possible given the constraint that it must not cross paths 1420, 1430. The recursive process continues in areas 1460, 1463, 1468, as long as half-integer intensity values exist between those of the paths bounding the areas. In the example shown in FIG. 14C, two fine paths 1470, 1480 are identified between paths 1450, 1460. Paths 1470, 1480 may be considered children of the paths 1440, 1450 and are given serial numbers N.1.1 and N.1.2, respectively, reflecting their order in the iterative process.

In the higher-quality method embodiment, the simple bridging technique is the first method used to identify fine paths. It covers a simple but common case where two parent paths have the same intensity value and the space between them contains nothing but nested doubling-back paths originating from the upper and lower rows of present samples. FIG. 15A illustrates exemplary parent and doubling-back paths targeted by a simple bridging technique in the higher-quality method embodiment. Two parent paths 1510, 1511, both at an intensity of 0.5, bound two doubling-back paths 1520, 1521 at the closest available intensity value, 1.5. Nested within paths 1520, 1521 are two paths 1530, 1531 at the next available intensity value of 2.5. A single path 1540 at an intensity of 3.5 represents deeper nesting of doubling-back paths around the sample point 1545. The outermost doubling-back paths at the same intensity are bridged (i.e., connected) to create recognized crossing paths until there are no more paths to connect. Because the intensities of bridged paths change monotonically, no fine passes are required between them, except if one sample row, upper or lower, originates more nested doubling-back paths than the other. In the latter case, a final finishing pass described below is conducted between the last bridged paths. FIG. 15B illustrates the result of applying the simple bridging technique to the paths of FIG. 15A. Paths 1520, 1521 in FIG. 15A have been bridged to create two recognized crossing paths 1550, 1551, while paths 1530, 1531 in FIG. 15A have been bridged to create two recognized crossing paths 1560, 1561. A final fishing pass will be executed between the paths 1560, 1561 because the path 1540 remains unbridged between them.

Figure 16A:
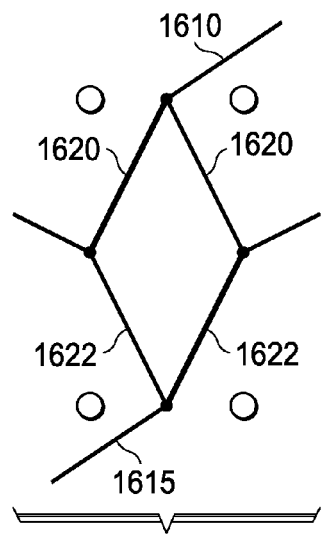
Figure 16B:
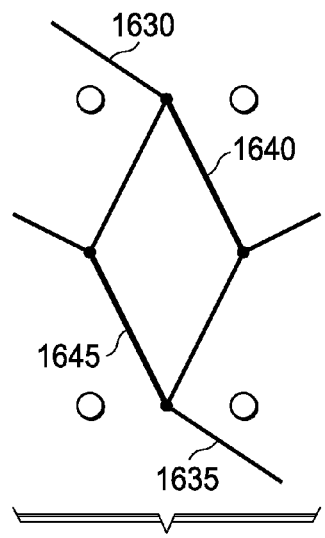
Figure 16C:
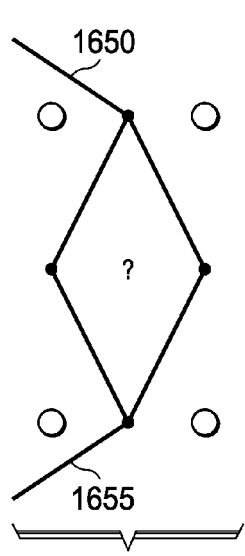
Figure 16D:
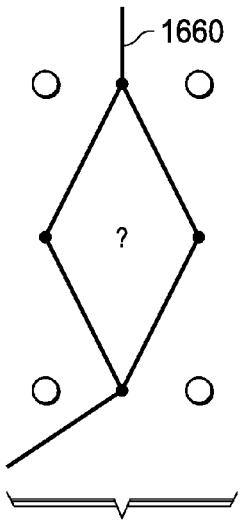
Figure 16E:
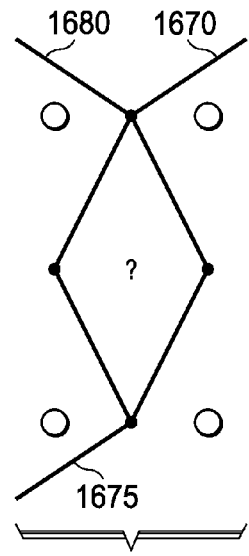

In the higher-quality method embodiment, the diamond-ambiguity technique is applied after the simple bridging technique. This technique attempts to resolve any diamond ambiguities into fine crossing paths by first determining if traces extending the ambiguity into upper and lower gaps are complementary. Traces are complementary if they leave the ambiguity in opposite directions unambiguously. FIGS. 16A-E illustrate a technique for resolving a diamond-ambiguity based on the complementarity of extending traces, in the higher-quality method embodiment. In FIG. 16A, upper and lower extending traces 1610, 1615 both support a lower-left-to-upper-right direction. Due to this unambiguous complementary support, diamond segments 1620, 1622 are dropped from further consideration, in favor of remaining segments 1626, 1628 and any paths including them. In FIG. 16B, traces 1630, 1635 provide unambiguous complementary support for an upper-left-to-lower-right direction and segments 1650, 1655 are selected. The ambiguity cannot be resolved in the examples of FIG. 16C, wherein traces 1650, 1655 are not complementary, and FIG. 16D, wherein a trace 1660 is vertical and does not support a direction. In FIG. 16E, although traces 1670, 1675 provide complementary support, the support is not unambiguous due to the presence of a trace 1680. The diamond ambiguity in FIG. 16E is therefore not resolved. Once a diamond ambiguity is resolved in favor of two of its segments, paths involving these segments are examined and recognized as fine paths if they are crossing paths, if they end within their parents' boundaries, and if they pass the feature-matching test.

If a path is not found using the diamond-ambiguity technique, the complex bridging technique is used next to see if a crossing path may be recognized by bridging in the pattern. FIGS. 17A-C illustrate exemplary patterns addressed by a simple bridging technique, a diamond-ambiguity technique, and a complex bridging technique, respectively, in the higher-quality method embodiment. FIGS. 17A-C elucidate the relationship between the three techniques. As shown in FIG. 17A, the simple bridging technique is intended to process doubling-back paths 1710, 1715, which are bound by parent paths 1720, 1725 at the closest intensity value. As shown in FIG. 17B, the diamond ambiguity technique may be interpreted as addressing two doubling-back paths 1730, 1735, which are not bound by parent paths at the nearest intensity value, but are close enough to possibly form a diamond pattern. FIG. 17C illustrates an exemplary pattern addressed by the complex bridging technique, wherein two doubling-back paths 1745, 1750 are neither bound by parent paths at the nearest intensity value nor close enough to possibly form a diamond pattern.

In an embodiment, a number of conditions must be met before crossing paths may be recognized through bridging in the complex bridging technique. First, extending traces in the upper and lower gaps must be unambiguously complementary, in the sense described above for the diamond ambiguity technique. Second, the pattern must pass a width test. FIG. 18 illustrates a width test of a complex bridging technique in the higher-quality method embodiment. A doubling back path 1810 consists of equal-intensity lines 1812, 1817, and a doubling-back path 1820 consists of equal-intensity lines 1822, 1827. Paths 1810, 1820 have unambiguous complementary support. The horizontal gap between the paths 1810, 1820 is D, the distance between the closest crossing points of the paths 1810, 1820. The width of supporting trace 1830, which is a crossing trace in the upper gap 1840, is the horizontal distance WUPPER between the crossing points 1851, 1852 of the trace 1830. The width of the supporting trace 1860, which is a doubling-back trace in the lower gap 1870, is the horizontal distance WLOWER between the crossing points 1881, 1882 of the trace 1860. The width test states that the horizontal gap between the two doubling-back paths must be smaller than the horizontal width of both supporting traces, measured between their respective crossing points. If an extending trace ends in a diamond ambiguity, it is treated and measured as a crossing path. In this example, the test requires that D≤WUPPER and D≤WLOWER. Since the test is passed equal-intensity lines 1817, 1827 are selected for potential bridging. Third, both doubling-back paths must be bounded by the parent paths. Fourth, potential bridged paths must pass the feature-matching test. If all the conditions above are met, the doubling-back paths are bridged to form a crossing path. In FIG. 18, a crossing path consisting of lines 1827, 1890, 1817 is recognized. For safety reasons, the complex bridging technique is not attempted on doubling backs paths with gaps larger than 8 horizontal sample spacings.

In the higher-quality method embodiment, if all three techniques described above fail to lead the recognition a crossing path, a final finishing technique is applied to determine if a non-bridged doubling-back gap may be clipped to improve the interpolation for missing sample intensities. Clipping is an embodiment of conditional straightening. Every doubling-back path bounded by the parent paths is examined, proceeding from left to right first among paths extending downward from the upper row of present samples and next among those extending upward from the lower row of present samples. First, if both extending traces at the path's beginning and end points are not crossing traces, the path is dropped from further consideration. Second, a test is applied to each extending trace to determine if it should modify the path. The test consists of three requirements.

The first requirement is that the extending trace must be mostly concave. A trace is mostly concave if at least 80% of the total area between it and its maximally straightened version lies on the same side of the trace as the doubling-back path. FIGS. 19A and 19B illustrate an example of a calculation and an approximation, respectively, used to determine if a trace is mostly concave in the higher-quality method embodiment. A crossing trace 1910 extends a doubling-back path 1920. Areas 1930, 1933 exist between the trace 1910 and its maximally straight version 1940. In this example, trace 1910 would mostly concave if the area 1933, which is on the same side of the trace 1910 as the path 1920, were at least 80% of the sum of areas 1930, 1933. Trace 1910 is not mostly concave. In one embodiment, areas are approximated by sums of vertical distances between the trace and its maximally straightened version at all horizontal sample locations within them. In FIG. 19B, the areas 1930, 1933 are approximated by a+b and c, respectively. In this embodiment, Trace 1910 is considered mostly concave if $c/(a+b+c) \geq 0.8$. The second requirement in this embodiment is that the roughness parameter R for the trace should be at most 0.03125. The third requirement in this embodiment is that the extending trace must extend horizontally away from the path and its beginning and end points must reside in different unit cells.

Figure 20A:
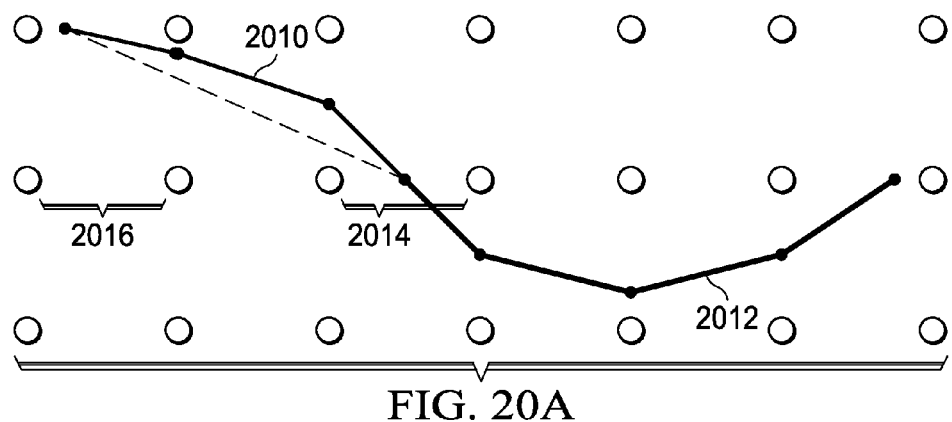
Figure 20B:
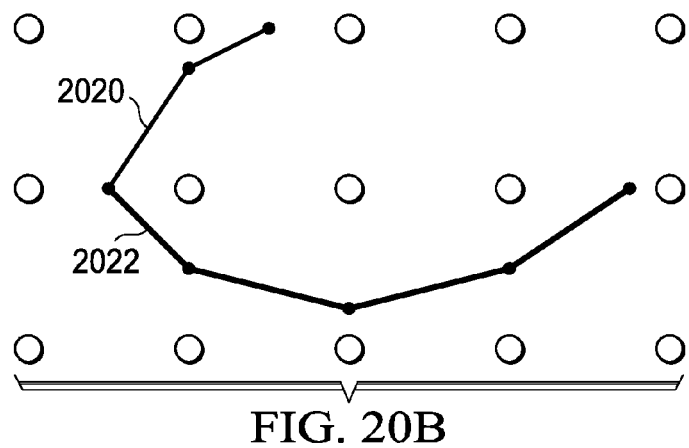
Figure 20C:
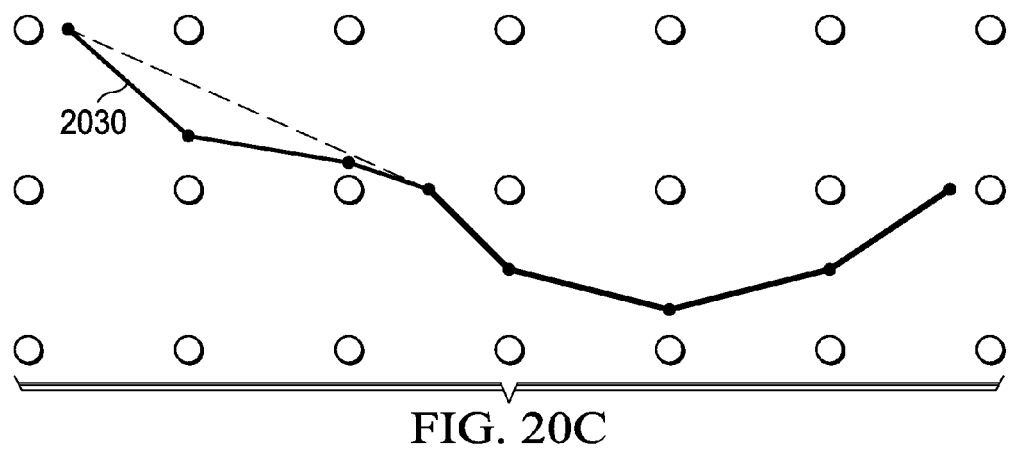
Figure 20D:
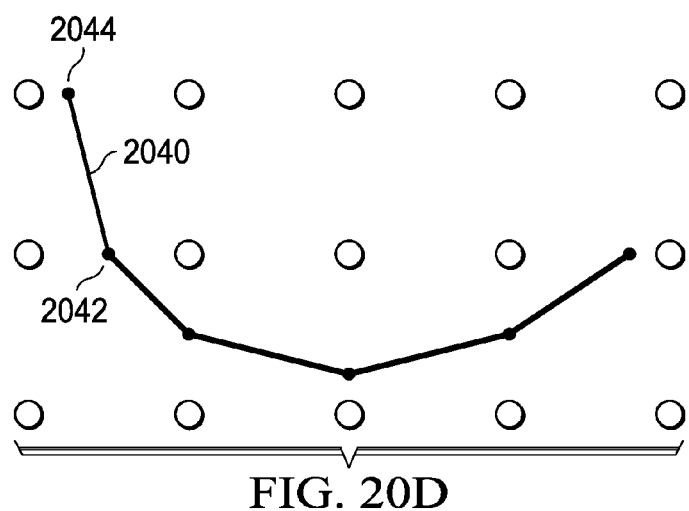
Figure 20E:
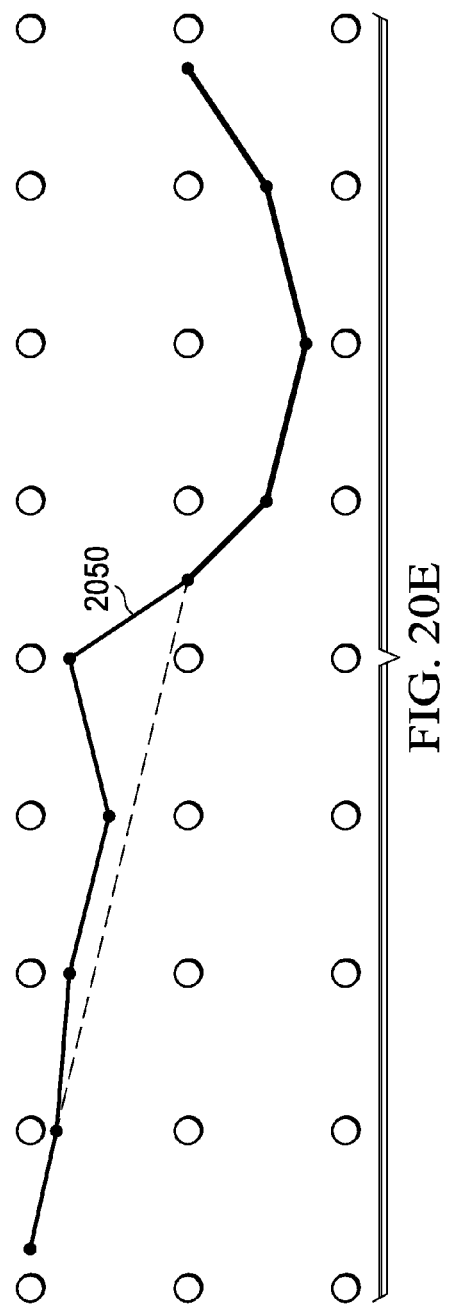

FIGS. 20A-20E illustrate application of a final finishing technique to exemplary patterns, in the higher-quality method embodiment. In FIG. 20A, extending trace 2010 extends horizontally away from path 2012, begins and ends in different unit cells 2014, 2016, exhibits zero roughness, and is mostly concave. Trace 2010 is selected to clip the path 2012. In FIG. 20B, trace 2020 does not extent horizontally away from the path 2022 and is therefore not selected to clip the path 2022. In FIG. 20C, trace 2030 is not mostly concave and is not selected. Trace 2040 in FIG. 20D is not selected because its beginning point 2042 and end point 2044 lie within the same unit cell. In FIG. 20E, the trace 2050 is not selected because its roughness parameter is larger than 0.03125.

In the higher-quality method embodiment, traces extending a doubling-back path and selected above are used to clip any portions of it extending outside them. FIGS. 21A and 21B illustrate a path before and after the clipping process of the final finishing technique in the higher-quality method embodiment. In FIG. 21A, two extending traces 2110, 2120 have been selected to modify a path 2130. As shown in FIG. 21B, a maximally straightened version 2140 of the extending trace 2110 is used to clip the path and produce a new segment 2150. Likewise, a maximally straightened version 2160 of the extending trace 2120 is used to clip the path and produce a new segment 2170. A clipped path 2180 includes the segments 2150, 2170. In an embodiment of the final finishing technique, clipping is applied not to the doubling-back path 2130 of FIG. 21A, but instead to a version of this path first modified by the presence of any parent paths. In an embodiment, modification of the doubling-back path by a parent path is performed by vertical interpolation conducted at the horizontal position of the missing sample, described below.

Since the final finishing technique is the last technique applied to recognize paths, doubling-back paths found using it are the last to be recorded for any missing sample location. In addition, they will cross the vertical gap between a present and a missing sample point closer to the present sample than any paths previously recorded. Any nested doubling-back paths will be cross the gap even closer to the present sample. As a result, it is only necessary to constraint these paths against those already recorded, and no serial numbers need to be stored for them. FIG. 22 is an exemplary illustration of the recording process for doubling-back fine paths for a missing sample point in the higher-quality method embodiment. A missing sample 2210 is located between present sample points 2220, 2221 at intensities of 100, 200, respectively. A parent path 2230 at an intensity of 190.5 passes between the missing sample 2210 and the present sample 2221. An original doubling-back path 2240, resulting from equal-intensity lines obtained through interpolation between present sample points, has an intensity of 175.5. As noted above, the path 2240 is first modified in light of the parent path 2230 through vertical interpolation between the present sample 2220 and the parent path 2230, producing the path 2250. Next, clipping by extending traces further modifies the path 2250 and produces the final path 2260. The y coordinate of the point 2270 is recorded. Two doubling-back paths 2280, 2290, originally nested within the path 2240, will necessarily pass below path 2260 following the same modification process. The paths 2280, 2290 are therefore irrelevant to determining the intensity at the missing sample 2210 and will not be recorded.

An simplified method embodiment will now be described in detail. As noted earlier, this algorithm is advantageous where memory resources and processing power are constrained, at the cost of decreased quality.

In the simplified method embodiment, crossing paths without ambiguities are recognized. In addition, attempts are made to recognize modifying crossing paths by resolving ambiguities and by bridging doubling-pack paths, when possible. FIGS. 23A-F illustrate exemplary paths and ambiguities used in the simplified method embodiment. As in the higher-quality algorithm, a doubling-back path is a path that turns back on itself, crossing only one of the lower and upper rows of present samples twice, for example a path 2310 in FIG. 23A. A crossing path is a path that crosses the lower and upper rows of present samples once each, for example a path 2320 in FIG. 23B. In the simplified method embodiment, a crossing path may be modifying or barrier-only. A modifying crossing path is a crossing path that meets a set of conditions described below and is therefore used in potentially modifying interpolation for missing sample intensities. A barrier-only crossing path does not meet said conditions, is not directly used in intensity interpolation, and only serves to block bridging of doubling-back paths.

Figure 23A:
Figure 23B:
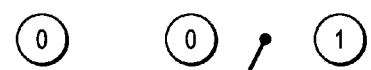
Figure 23C:
Figure 23D:
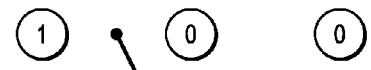
Figure 23E:
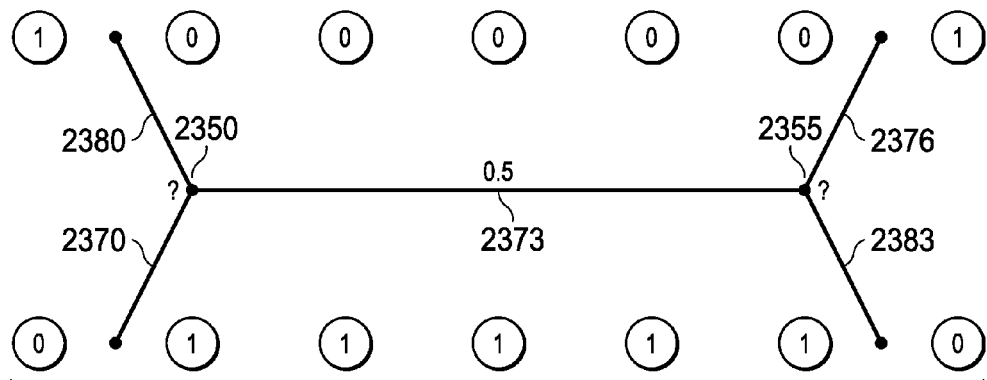
Figure 23F:
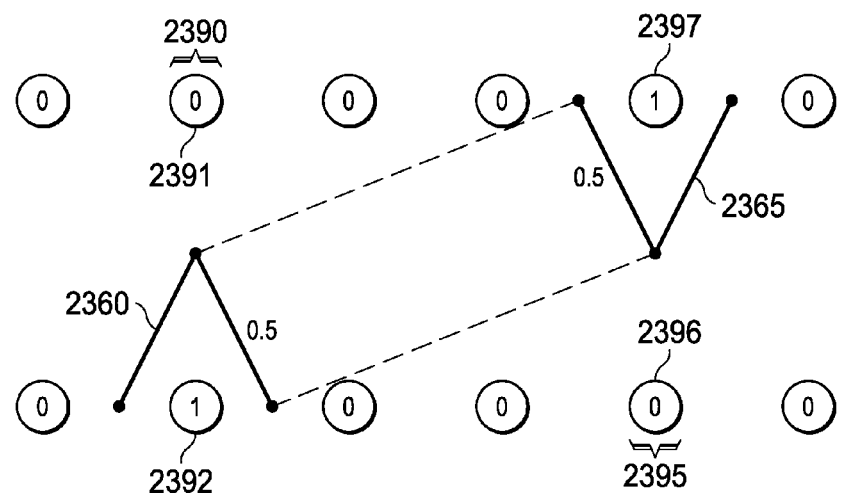

In FIG. 23C, an ambiguity exists as to whether a doubling-back path consisting of lines 2330, 2333 or a crossing path consisting of lines 2330, 2336 should be recognized. In FIG. 23D, an ambiguity exists as to whether a crossing path consisting of lines 2340, 2343 or a crossing path consisting of lines 2340, 2346 should be recognized. In FIG. 23E, two ambiguities 2350, 2355 make it unclear whether a crossing path from the lower left to the upper right or from the upper left to the lower right should be recognized. In FIG. 23F, it is unclear if two doubling-back paths 2360, 2365 should be bridged to form crossing paths.

Figure 24A:
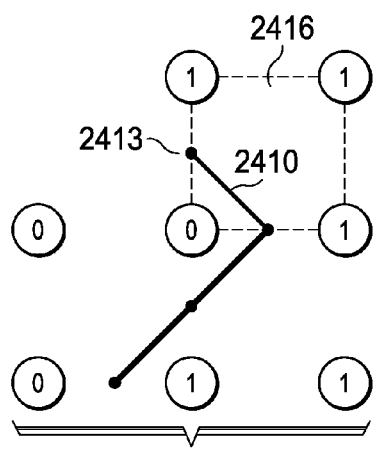
Figure 24B:
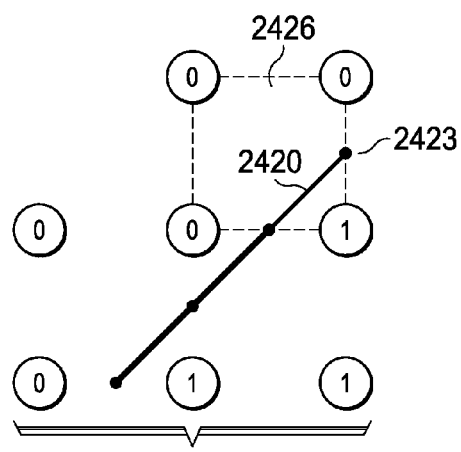
Figure 24C:
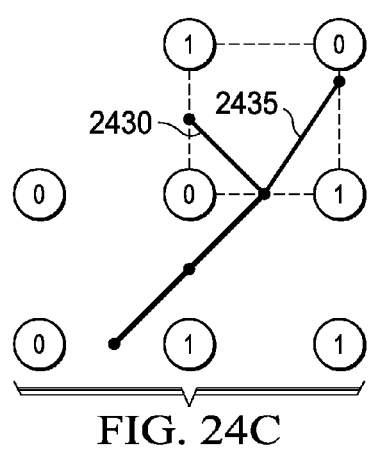
Figure 24D:
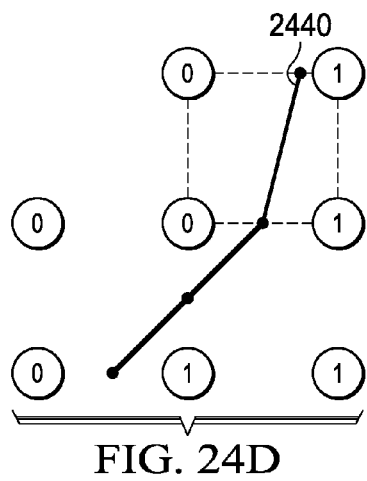

In the simplified method embodiment, ambiguities such as those in FIGS. 23C-E are resolved when side-crossing extensions extend away from the ambiguity in opposite horizontal directions. FIGS. 24A-D illustrate the classification of extending traces used in an simplified method embodiment. Side-crossing extensions are defined as extending traces that cross the left or right edges of the unit cell in which they lie. In FIG. 24A, an extending trace 2410 is a side-crossing extension because it crosses the left edge 2413 of the unit cell 2416. In FIG. 24B, an extending trace 2420 is a side-crossing extension because it crosses the left edge 2424 of the unit cell 2426. In FIG. 24C, two side-crossing traces 2430, 2435 both exist. In FIG. 24D, an extending trace 2440 is not side-crossing, even though it is not vertical.

FIGS. 25A-C illustrate resolution of exemplary ambiguities in the simplified method embodiment. In FIG. 25A, two side-crossing extensions 2510, 2512 extend away from the ambiguity at point 2520 in opposite horizontal directions, both supporting a lower-left-to-upper-right direction and resolving the ambiguity in favor of the equal-intensity line 2530. Line 2535 is dropped from further consideration. In FIG. 25B, two side-crossing extensions 2540, 2542 extend away from the ambiguity at point 2550 in opposite horizontal directions, both supporting an upper-left-to-lower-right direction and resolving the ambiguity in favor of the equal-intensity line 2560. Line 2565 is dropped from further consideration. In FIG. 25C, two side-crossing extensions 2570, 2572 extend away from the ambiguity at point 2580 in the same horizontal directions. The ambiguity is not resolved.

If ambiguities in a trace are resolved, a crossing path is recognized. If a trace's ambiguities are not resolved, it may still be recognized as a barrier-only crossing path as follows. All potential crossing paths possible given existing ambiguities are considered. In FIG. 23E, for example, two potential crossing paths exist, one consisting of equal-intensity lines 2370, 2373, 2376, and another consisting of equal-intensity lines 2380, 2373, 2383. A potential crossing path is recognized as a barrier-only crossing path if it does not have contradicting extension and passes a path compatibility test, both described below. Multiple barrier-only paths may be recognized from the same trace, for example the two paths described above in FIG. 23E.

Figure 26A:
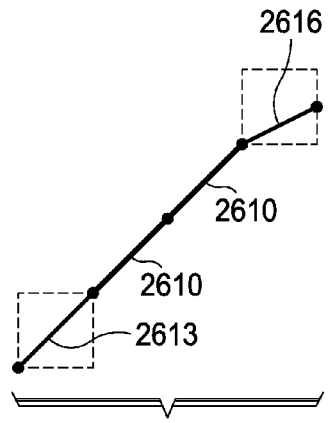
Figure 26B:
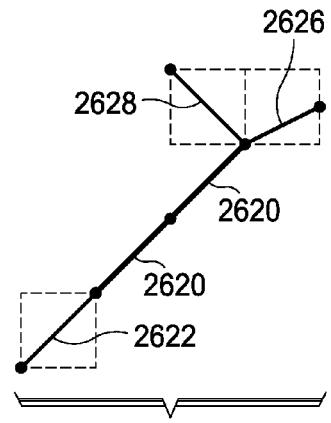
Figure 26C:
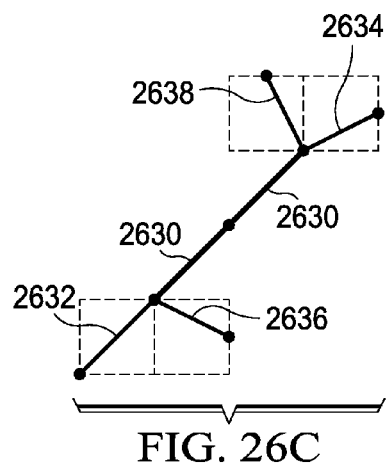
Figure 26D:
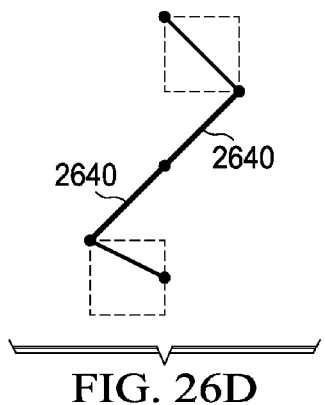
Figure 26E:
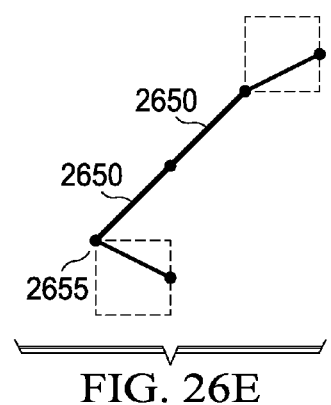

FIGS. 26A-E illustrate exemplary supportive and contradicting extensions in the simplified method embodiment. Sample points are not shown. A path has supportive extension if side-crossing extending traces exist at both of its end points along its direction, as evidenced by its beginning and end points. In FIG. 26A, a path 2610 has supportive extension because two side-crossing traces 2613, 2616 are in the same lower-left-to-upper-right direction as the path 2610. In FIG. 26B, a path 2620 has supportive extension because two side-crossing traces 2622, 2626 are along the path's direction. A side-crossing trace 2628 is not relevant as long as the trace 2626 exists. In FIG. 26C, a path 2630 has supportive extension because two side-crossing traces 2632, 2634 are along the path's direction. The side-crossing trace 2636 is not relevant since the trace 2632 exists. The trace 2638 is not relevant because it is not side-crossing. In FIG. 26D, a path 2640 has contradicting extension because only side-crossing extensions in the direction opposite to it exist at both of its crossing points. In FIG. 26E, a path 2650 has neither supportive nor contradicting extension since it lacks two side-crossing extension both along its direction or both in the opposite direction.

FIG. 27 illustrates a path compatibility test used in the simplified method embodiment. The path compatibility test is a method for testing the compatibility of intensity profiles at the end points of a path, similar to but simpler than the pattern-matching test used in the higher-quality method embodiment described above. In an embodiment, the test considers a window of four present sample points around each of a path's crossing points. In FIG. 27, four present samples 2710, 2711, 2712, 2713 with intensity values T0, T1, T2, and T3, respectively, are selected for the upper crossing point 2715. Four present samples 2730, 2731, 2732, 2733 with intensity values B0, B1, B2, and B3, respectively, are selected for the lower crossing point 2735. Quantities T1−T0, T2−T1, and T3−T2 are intensity gradients between adjacent sample points. An upper-window sum is calculated by summing these gradients, except any gradient that has a sign opposite to that of T2−T1. A lower-window sum is similarly calculated using B0, B1, B2, and B3. For example, if B2−B1 is negative but both B1−B0 and B3−B2 are positive, the lower-window sum is B2−B1. In an embodiment, a path passes the path compatibility test if both sums have a magnitude of at least three and the ratio between the larger and smaller sum magnitudes is no larger than six. Low magnitudes are indicative of image noise rather than true image features, and highly unequal magnitudes suggest that a single image feature is not shifting along the path.

In the simplified method embodiment, crossing paths originally without ambiguities, such as the path 2310 in FIG. 23A, and crossing paths resulting from resolution of ambiguities, are further classified into modifying and barrier-only paths. FIG. 28 is a flow diagram illustrating a method for classification of crossing paths into modifying and barrier-only paths in the simplified method embodiment. The method starts at a start step 2810. In a decisional step 2820, if a crossing path does not pass a path compatibility test, it is discarded. In a decisional step 2840, if a crossing path has contradictory extension, it is discarded. In a decisional step 2860, if a crossing path does not have supporting extension, it is classified as a barrier only path, and if it does, it is classified as a modifying path. The method ends in an end step 2890.

Bridging doubling-back paths in the simplified method embodiment will now be described. In FIG. 23F, the doubling-back path 2360 lies in a region 2390 of downward intensity gradient from a sample 2391 to a sample 2392. By contrast, the doubling-back path 2365 lies in a region 2395 of upward intensity gradient from a sample 2396 to a sample 2397. Intensity gradient regions 2390, 2395 are adjacent, since they are separated only by a region where the gradient reverses. In an embodiment, two doubling-back paths at the same intensity level may be bridged to form two modifying crossing paths if and only if the following seven conditions are met. First, the doubling-back paths must be in adjacent vertical intensity gradient regions. Second, there must be no other doubling-back paths between them. Third, the closest horizontal distance between the two paths, i.e., the horizontal distance between the leftmost crossing point of the rightmost path and the rightmost crossing point of the leftmost path, must not be more than 8 horizontal sample spacings apart.

Fourth, for each path, a side-crossing extension at the crossing point horizontally closest to the other path must extend horizontally away from the other path and project to a point horizontally farther than the horizontally closest crossing point of the other path. FIG. 29 illustrates direction and projection of extensions in an exemplary bridging case in the simplified method embodiment. Not all present samples are shown. A crossing point 2905 is the closest crossing point of a doubling-back path 2910 to a doubling-back path 2920, the closest crossing point of which to the path 2910 is the point 2925. If paths 2910, 2920 meet the conditions described herein, they will be bridged to form two crossing paths 2930, 2940. A side-crossing extension 2950 at the point 2905 extends horizontally away from the path 2920, while a side-crossing extension 2960 at the point 2925 extends horizontally away from the path 2910. The extension 2950 projects to a point 2953 on an upper row 2956 of present samples, and the extension 2960 projects to a point 2963 on a lower row 2966 of present samples. The point 2953 is horizontally farther from the path 2910 than the point 2925, while the point 2963 is horizontally farther from the path 2920 than the point 2905. In this example, the fourth condition is met.

Fifth, no modifying or barrier-only paths may cross either of the would-be bridged paths, paths 2930, 2940 in the example of FIG. 29. Sixth, each unit cell of present samples between the closest sample points enclosed by the two doubling-back paths is examined to find any paths that cross the upper and lower edges of the unit cell without crossing its right or left edges, and pass the path compatibility test. There must be no such paths crossing the would-be bridged paths. In the example of FIG. 29, the closest sample points enclosed by the two doubling-back paths are two sample points 2970, 2980. Seventh, both would-be bridged paths must pass the path compatibility tests. If one would-be bridged path fails the test, neither bridge path is recognized. In simplified method embodiment, modifying paths recognized through the procedures described above are used in the interpolation for intensities at missing sample points in a manner described in FIG. 3.

The higher-quality and simplified method embodiments are generally directed to carrying out steps: recognizing equal-intensity paths in equal-intensity traces and at least partially straightening them. FIG. 30 is a flow diagram of one embodiment of a method for producing a frame from a field. The method begins in a start step 3010. In a step 3020, equal-intensity traces are generated. In a step 3030, equal-intensity paths are recognized in equal-intensity traces. In a step 3040, recognized equal-intensity paths are at least partially straightened. In a step 3050, intensity values for missing samples are determined using the paths. The method ends in an end step 3060.

Those skilled in the art to which this application relates will appreciate that other and further additions, deletions, substitutions and modifications may be made to the described embodiments. For example, equal-intensity traces may be generated at different intensity values by different procedures, they may be linear or curved. Different criteria may be used for determining which paths are likely to reflect true image features, or should be recognized. Different calculations may be adopted for conditional straightening, for determining or quantifying support by extending traces, concavity, or compatibility of intensity profiles at path ends.

What is claimed is:

1. An apparatus for producing a video frame from a video field, the apparatus comprising:
a circuit configured to create an equal-intensity trace from present samples in said video field, recognize an equal-intensity path in said equal-intensity trace, at least partially straighten said equal-intensity path, and use said equal-intensity path to determine an intensity value for a missing sample in said video frame.

2. The apparatus as recited in claim 1, wherein said circuit is configured to use said equal-intensity path to determine said intensity value by interpolating between closest ones of present samples and said equal-intensity path to said missing sample.

3. The apparatus as recited in claim 1, wherein said equal-intensity path is recognized based on a likelihood of reflecting true image features.

4. The apparatus as recited in claim 1, wherein said circuit is configured to recognize said equal-intensity path by selecting said equal-intensity path based on a direction of an extending trace of said equal-intensity path.

5. The apparatus as recited in claim 1, wherein said circuit is configured to recognize said equal-intensity path by selecting said equal-intensity trace based on a compatibility of intensity profiles at beginning point and end points of said equal-intensity path.

6. The apparatus as recited in claim 1, wherein said circuit is configured to recognize said equal-intensity path by bridging said equal-intensity path with another equal-intensity path in another equal-intensity trace.

7. The apparatus as recited in claim 1, wherein said circuit is configured to create said equal-intensity trace by:
linearly interpolating between present samples to locate equal-intensity points;
drawing equal-intensity lines between said equal-intensity points; and
connecting said equal-intensity lines.

8. The apparatus as recited in claim 1, wherein said equal-intensity path is at least partially straightened based on likelihood of reflecting true image features.

9. The apparatus as recited in claim 1, wherein said circuit is configured to at least partially straighten said equal-intensity path by clipping said equal-intensity path using maximally straightened extending traces of said equal-intensity path.

10. The apparatus as recited in claim 1, wherein said circuit is configured to at least partially straighten said equal-intensity path by straightening based on a roughness of said equal-intensity path.

11. The apparatus as recited in claim 1, wherein said circuit is configured to at least partially straighten said equal-intensity path by straightening based on a direction of an extending trace of said equal-intensity path.

12. A method of producing a video frame from a video field using a graphics processing unit (GPU), comprising:
recognizing equal-intensity paths in equal-intensity traces generated from present samples in said video field using said GPU;
at least partially straightening said equal-intensity paths; and
using said equal-intensity paths to determine an intensity value for a missing sample in said video frame.

13. The method as recited in claim 12, wherein said using comprises interpolating between closest ones of present samples and said equal-intensity path to said missing sample.

14. The method as recited in claim 12, wherein said recognizing is carried out based on a likelihood of reflecting true image features.

15. The method as recited in claim 12, wherein said recognizing comprises selecting said equal-intensity path based on a direction of an extending trace of said equal-intensity path.

16. The method as recited in claim 12, wherein said recognizing comprises selecting said equal-intensity trace based on a compatibility of intensity profiles at beginning point and end points of said equal-intensity path.

17. The method as recited in claim 12, wherein said equal-intensity paths are recognized by bridging paths in equal-intensity traces.

18. The method as recited in claim 12, wherein said at least partially straightening is carried out based on likelihood of reflecting true image features.

19. The method as recited in claim 12, wherein said at least partially straightening comprises clipping said equal-intensity path using maximally straightened extending traces of said equal-intensity path.

20. The method as recited in claim 12, wherein said at least partially straightening comprises straightening based on a roughness of said equal-intensity path.

21. The method as recited in claim 12, wherein said at least partially straightening comprises straightening based on a direction of an extending trace of said equal-intensity path.

* * * * *